US012753636B2

(12) United States Patent
Wang

(10) Patent No.: US 12,753,636 B2
(45) Date of Patent: Oct. 6, 2026

(54) LOCK FOR DATA INTERFACE

(71) Applicant: Haining Wang, Shenzhen City (CN)

(72) Inventor: Haining Wang, Shenzhen City (CN)

( * ) Notice: Subject to any disclaimer, the term of this patent is extended or adjusted under 35 U.S.C. 154(b) by 0 days.

(21) Appl. No.: 19/330,818

(22) Filed: Sep. 16, 2025

(65) Prior Publication Data

US 2026/0015889 A1 Jan. 15, 2026

Related U.S. Application Data

(63) Continuation-in-part of application No. 18/742,893, filed on Jun. 13, 2024, now Pat. No. 12,493,725.

(51) Int. Cl.

*E05B 65/00* (2006.01)
*E05B 9/08* (2006.01)
*E05B 57/00* (2006.01)
*H01R 13/447* (2006.01)

(52) U.S. Cl.

CPC .............. *E05B 65/00* (2013.01); *E05B 9/084* (2013.01); *E05B 57/00* (2013.01); *H01R 13/447* (2013.01)

(58) Field of Classification Search

CPC .......... E05B 65/00; E05B 9/084; E05B 57/00; H01R 13/447
USPC .............................................................. 70/57
See application file for complete search history.

(56) References Cited

U.S. PATENT DOCUMENTS

| | | | | |
|---|---|---|---|---|
| 5,577,408 | A * | 11/1996 | Roos | E05B 9/084 70/451 |
| 6,393,883 | B1 * | 5/2002 | Freck | E05C 3/042 70/455 |
| 7,304,855 | B1 * | 12/2007 | Milligan | G11B 33/128 |
| 7,712,618 | B2 * | 5/2010 | Barre | B65D 47/0871 215/354 |
| 8,951,054 | B2 * | 2/2015 | Byrne | H01R 35/04 362/127 |
| 9,331,444 | B2 * | 5/2016 | Carnevali | H01R 31/06 |
| 2010/0192642 | A1 * | 8/2010 | Hung | E05B 73/0082 70/58 |
| 2012/0200989 | A1 * | 8/2012 | Byrne | H01R 13/447 361/641 |
| 2014/0197170 | A1 * | 7/2014 | Carlile | B65D 47/249 220/262 |
| 2023/0332435 | A1 * | 10/2023 | Zhang | E05B 47/0012 |

* cited by examiner

*Primary Examiner* — Nathan Cumar

(57) ABSTRACT

A lock for a data interface includes a lock case main body, a locking arm, an elastic reset device and a locking device. The lock case main body is provided with a first opening, and the first opening is configured to sleeve a data interface. The locking arm is rotatably connected to the lock case main body. The locking arm is able to be moved between a locked position and an unlocked position by rotation. The elastic reset device is connected to the locking arm to push and reset the locking arm to the locked position, so that the locking arm clamps the data interface together with a side wall of the first opening. The locking device is connected to the lock case main body. The locking device is configured to lock the locking arm.

16 Claims, 19 Drawing Sheets

LOCK FOR DATA INTERFACE

CROSS-REFERENCE TO RELATED APPLICATIONS

This application is a continuation in part of U.S. application Ser. No. 18/742,893, filed on Jun. 13, 2024, the content of which is incorporated by reference herein.

TECHNICAL FIELD

The present invention relates to the field of data interfaces, in particular to a lock for a data interface.

BACKGROUND ART

A data interface can facilitate a user to read data stored in a device, but there are no protective measures for the existing data interfaces on the market. Anyone can read data in devices through the data interfaces, which has extremely poor security. Therefore, data is easily leaked, and some criminals would tamper the data in the devices through the data interfaces. Therefore, there is an urgent need to provide a lock for a data interface on the market to improve the security of the data interface.

SUMMARY

In order to overcome the shortcomings of the prior art, the present invention provides a lock for a data interface.

The lock for a data interface includes:

- a lock case main body, wherein the lock case main body is provided with a first opening, and the first opening is configured to sleeve a data interface;
- a locking arm, wherein the locking arm is rotatably connected to the lock case main body; the locking arm is able to be moved between a locked position and an unlocked position by rotation;
- an elastic reset device, wherein the elastic reset device is connected to the locking arm to push and reset the locking arm to the locked position, so that the locking arm clamps the data interface together with a side wall of the first opening;
- a locking device, wherein the locking device is connected to the lock case main body; the locking device is configured to lock the locking arm; when the locking device is in an unlocked state, the locking arm is able to be moved between the locked position and the unlocked position by rotation; and when the locking device is in a locked state, the locking arm is unable to be rotated, and the locking device locks the locking arm in the locked position.

As an improvement of the present disclosure, the lock case main body is further provided with a second opening; the locking device includes a mounting housing, a lock cylinder, and a baffle plate; the mounting housing is mounted at the second opening; the lock cylinder is arranged in the mounting housing, and the lock cylinder is able to rotate in the mounting housing; the baffle plate sleeves the lock cylinder; the baffle plate is able to rotate with the lock cylinder, so that the baffle plate is able to move between a first position and a second position by rotation; when the baffle plate moves to the first position, the baffle plate blocks and locks the locking arm in the locked position; and when the baffle plate moves to the second position, the baffle plate relieves the blockage on the locking arm, so that the locking arm is able to be rotated to the unlocked position to relieve the clamping of the locking arm on the data interface.

As an improvement of the present disclosure, several first locking members are arranged in the mounting housing; the first locking members are configured to lock the lock cylinder to the mounting housing; when the first locking members are in an unlocked state, the lock cylinder is able to rotate in the mounting housing; the baffle plate is able to rotate with the lock cylinder, so that the baffle plate is able to move between the first position and the second position by rotation; and when the first locking members are in a locked state, the lock cylinder is unable to rotate in the mounting housing, so as to fix the baffle plate in the second position, so that the baffle plate blocks and locks the locking arm in the locked position.

As an improvement of the present disclosure, the lock cylinder is provided with a key hole; each first locking member includes a first locking pin, a second locking pin, and a first spring; a first locking hole is provided in the mounting housing; a second locking hole is provided in the lock cylinder; the first spring is arranged in the first locking hole; one end of the first locking pin is connected to the first spring; the second locking pin is inserted into the second locking hole; the other end of the first locking pin is abutted with the second locking pin; a first joint is formed between the first locking pin and the second locking pin; a second joint is formed at a connection between the lock cylinder and the mounting housing; when the first joint is aligned with the second joint, the first locking member is in the unlocked state; two ends of the first locking pin are located in the first locking hole; two ends of the second locking pin are located in the second locking hole; the lock cylinder is able to rotate in the mounting housing, and the baffle plate is able to rotate with the lock cylinder, so that the baffle plate is able to rotate between the first position and the second position; when the first joint is misaligned with the second joint, the first locking member is in the locked state; one end of the first locking pin is inserted into the second locking hole, and the other end of the first locking pin is inserted into the first locking hole, so that the lock cylinder is unable to rotate in the mounting housing; or, when the first joint is misaligned with the second joint, the first locking member is in the locked state; and one end of the second locking pin is inserted into the second locking hole, and the other end of the second locking pin is inserted into the first locking hole, so that the lock cylinder is unable to rotate in the mounting housing.

As an improvement of the present disclosure, lengths of the first locking pins of the several first locking members are the same, and lengths of the second locking pins of the several first locking members are different from one another.

As an improvement of the present disclosure, the locking arm is provided with a first end, a second end, a rotating shaft, and a connecting end located between the first end and the second end, and the connecting end is rotatably connected to the lock case main body through the rotating shaft.

As an improvement of the present disclosure, when the baffle plate moves to the first position, the baffle plate pushes and blocks the first end in a direction facing away from the side wall of the first opening to push and block the second end in a direction close to the side wall of the first opening; the second end of the locking arm is blocked and locked in the locked position; the second end of the locking arm clamps the data interface together with the side wall of the first opening; when the baffle plate moves to the second position, the baffle plate relieves the blockage on the locking arm, so that the first end is able to rotate in the direction close to the side wall of the first opening; and the second end is able to rotate to the unlocked position in the direction facing away from the side wall of the first opening, so that the second end is separated from the data interface to relieve the clamping of the second end of the locking arm on the data interface.

As an improvement of the present disclosure, the lock case main body is further provided with an avoidance slot; when the baffle plate moves to the first position, the baffle plate is located in the avoidance slot; the baffle plate pushes and blocks the first end in the direction facing away from the side wall of the first opening to push the second end in the direction close to the side wall of the first opening; the first end is unable to rotate into the avoidance slot; when the baffle plate moves to the second position, the baffle plate moves out of the avoidance slot; the baffle plate relieves the blockage on the locking arm, so that the first end is able to rotate into the avoidance slot in the direction close to the side wall of the first opening; and the second end is able to rotate to the unlocked position in the direction facing away from the side wall of the first opening, so that the second end is separated from the data interface and relieves the clamping of the second end of the locking arm on the data interface.

As an improvement of the present disclosure, the elastic reset device is connected to the rotating shaft.

As an improvement of the present disclosure, the elastic reset device is a torsion spring; the torsion spring is provided with a first sleeving opening; the torsion spring sleeves the rotating shaft through the first sleeving opening; the first opening is further provided with a limiting column on the side wall; the torsion spring is provided with a first elastic arm and a second elastic arm; the second elastic arm is located between the second end and the limiting column; the first elastic arm pushes the first end in the direction facing away from the side wall of the first opening to push the second end in the direction close to the side wall of the first opening; and the second end clamps the data interface together with the side wall of the first opening.

As an improvement of the present disclosure, the second end of the locking arm is provided with a first hook portion; and when the locking arm is rotated to the locked position, the first hook portion is connected to a first hook fitting portion of the data interface.

As an improvement of the present disclosure, a second positioning groove is provided at the first end of the locking arm; when the baffle plate moves to the first position, the baffle plate resists against an inner wall of the second positioning groove; the baffle plate pushes and blocks the first end in a direction facing away from the side wall of the first opening to push and block the second end in a direction close to the side wall of the first opening; the second end of the locking arm is blocked and locked in the locked position; and the second end of the locking arm clamps the data interface together with the side wall of the first opening.

As an improvement of the present disclosure, the data interface is an On-Board Diagnostic data interface.

As an improvement of the present disclosure, a second sleeving opening is provided on the baffle plate, and the baffle plate sleeves the lock cylinder through the second sleeving opening.

As an improvement of the present disclosure, the second opening is provided with a first positioning protrusion on an inner wall; a first positioning groove is provided on an outer side wall of the mounting housing; the first positioning groove is connected to the first positioning protrusion; or, the second opening is provided with a first positioning groove on an inner wall; a first positioning protrusion is arranged on an outer side wall of the mounting housing; and the first positioning groove is connected to the first positioning protrusion.

As an improvement of the present disclosure, the mounting housing includes a first mounting portion and a second mounting portion; the first mounting portion is provided with a first flange; the second mounting portion is provided with a second flange; the second mounting portion detachably sleeves the first mounting portion to form the first positioning groove between the first flange and the second flange; and the second flange compresses the first positioning protrusion onto the first flange.

As an improvement of the present disclosure, the second mounting portion is in threaded connection to the first mounting portion.

As an improvement of the present disclosure, the lock case main body includes an upper case and a lower case; and the upper case is detachably connected to the lower case.

As an improvement of the present disclosure, the upper case is connected to the lower case through a buckle.

The present disclosure further provides a lock for an OBD (On-Board Diagnostics) data interface, including:

- a lock case main body, wherein the lock case main body is provided with a first opening, and the first opening is configured to sleeving a data interface;
- a locking arm, wherein the locking arm is rotatably connected to the lock case main body; the locking arm is able to be moved between a locked position and an unlocked position by rotation;
- an elastic reset device, wherein the elastic reset device is connected to the locking arm to push and reset the locking arm to the locked position, so that the locking arm clamps the data interface together with a side wall of the first opening;
- a locking device, wherein the locking device is connected to the lock case main body; the locking device is configured to lock the locking arm; when the locking device is in an unlocked state, the locking arm is able to be moved between the locked position and the unlocked position by rotation; and when the locking device is in a locked state, the locking arm is unable to be rotated, and the locking device locks the locking arm in the locked position.

The present disclosure has the beneficial effects: the present disclosure provides a lock for a data interface.

The lock includes a lock case main body, wherein the lock case main body is provided with a first opening, and the first opening is configured to sleeve a data interface; a locking arm, wherein the locking arm is rotatably connected to the lock case main body; the locking arm can be moved between a locked position and an unlocked position by rotation; an elastic reset device, wherein the elastic reset device is connected to the locking arm to push and reset the locking arm to the locked position, so that the locking arm clamps the data interface together with a side wall of the first opening; a locking device, wherein the locking device is connected to the lock case main body; the locking device is configured to lock the locking arm; when the locking device is in an unlocked state, the locking arm can be moved between the locked position and the unlocked position by rotation; and when the locking device is in a locked state, the locking arm cannot be rotated, and the locking device locks the locking arm in the locked position. A user can use the locking device to lock the locking arm, and lock the locking arm in the locked position, so that the locking arm and the side wall of the first opening clamp the data interface, and the lock case main body closes the data interface, thereby preventing criminals from stealing data through the data interface. When a user needs to read data, the user can relieve the locking of the locking device on the locking arm, so that the locking device is in the unlocked state, and the locking arm can be rotated to the unlocked position. Thus, the locking arm can be separated from the data interface by rotation, so as to relieve the clamping of the locking arm and the side wall of the first opening on the data interface, which removes the lock case main body from the data interface, and the user can read the data using the data interface.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

The present disclosure is further described below in detail in combination with the accompanying drawings and embodiments.

DETAILED DESCRIPTION OF THE EMBODIMENTS

Figure 1:
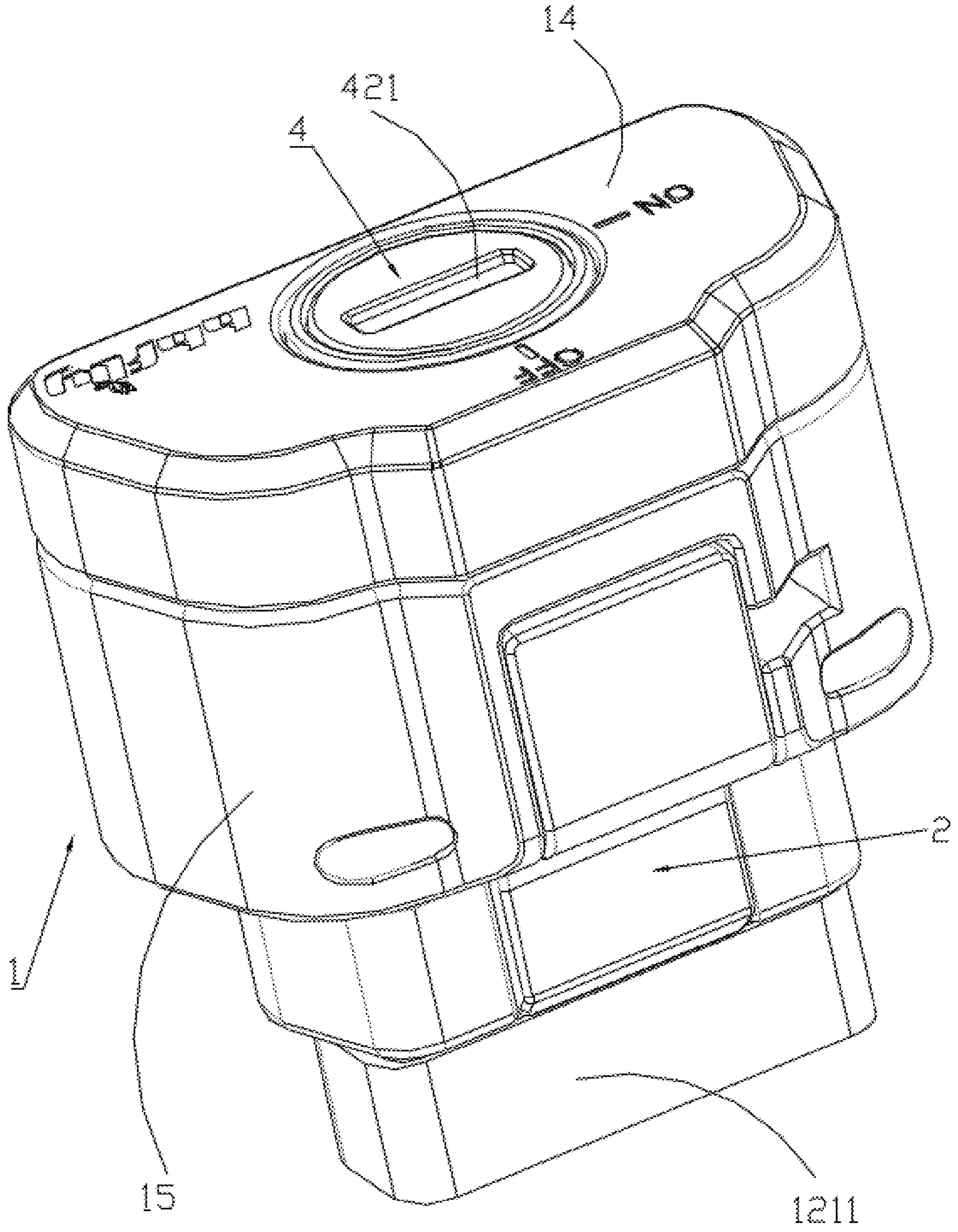
FIG. 1 is a schematic diagram of an overall structure according to a first embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

First Embodiment

Referring to FIG. 1 to FIG. 8, a lock for a data interface includes:

a lock case main body 1, wherein the lock case main body 1 is provided with a first opening 11, and the first opening 11 is configured to sleeve a data interface 12;

a locking arm 2, wherein the locking arm 2 is rotatably connected to the lock case main body 1; the locking arm 2 can be moved between a locked position and an unlocked position by rotation;

an elastic reset device 3, wherein the elastic reset device 3 is connected to the locking arm 2 to push and reset the locking arm 2 to the locked position, so that the locking arm 2 clamps the data interface together with a side wall of the first opening 11;

a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position.

Through the above structure, the lock includes: a lock case main body 1, wherein the lock case main body 1 is provided with a first opening 11, and the first opening 11 is configured to sleeve a data interface; a locking arm 2, wherein the locking arm 2 is rotatably connected to the lock case main body 1; the locking arm 2 can be moved between a locked position and an unlocked position by rotation; an elastic reset device 3, wherein the elastic reset device 3 is connected to the locking arm 2 to push and reset the locking arm 2 to the locked position, so that the locking arm 2 clamps the data interface together with a side wall of the first opening 11; a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position. A user can use the locking device 4 to lock the locking arm 2, and lock the locking arm 2 in the locked position, so that the locking arm 2 and the side wall of the first opening 11 clamp the data interface, and the lock case main body 1 closes the data interface, thereby preventing criminals from stealing data through the data interface. When a user needs to read data, the user can relieve the locking of the locking device 4 on the locking arm 2, so that the locking device 4 is in the unlocked state, and the locking arm 2 can be rotated to the unlocked position. Thus, the locking arm 2 can be separated from the data interface by rotation, so as to relieve the clamping of the locking arm 2 and the side wall of the first opening 11 on the data interface, which removes the lock case main body 1 from the data interface, and the user can read the data using the data interface.

In this embodiment, the lock case main body 1 is further provided with a second opening 13; the locking device 4 includes a mounting housing 41, a lock cylinder 42, and a baffle plate 43; the mounting housing 41 is mounted at the second opening 13; the lock cylinder 42 is arranged in the mounting housing 41, and the lock cylinder 42 can rotate in the mounting housing 41; the baffle plate 43 sleeves the lock cylinder (42); the baffle plate 43 can rotate with the lock cylinder 42, so that the baffle plate 43 can move between a first position and a second position by rotation; when the baffle plate 43 moves to the first position, the baffle plate 43 blocks and locks the locking arm 2 in the locked position; and when the baffle plate 43 moves to the second position, the baffle plate 43 relieves the blockage on the locking arm 2, so that the locking arm 2 can be rotated to the unlocked position to relieve the clamping of the locking arm 2 on the data interface. Several first locking members 411 are arranged in the mounting housing 41; the first locking members 411 are configured to lock the lock cylinder 42 to the mounting housing 41; when the first locking members 411 are in an unlocked state, the lock cylinder 42 can rotate in the mounting housing 41; the baffle plate 43 can rotate with the lock cylinder 42, so that the baffle plate 43 can move between the first position and the second position by rotation; and when the first locking members 411 are in a locked state, the lock cylinder 42 cannot rotate in the mounting housing 41, so as to fix the baffle plate 43 in the second position, so that the baffle plate 43 blocks and locks the locking arm 2 in the locked position. Through the above structure, the first locking members 411 can be switched to the unlocked state only if a correct key 1111 is inserted into the lock cylinder 42; the lock cylinder 42 can rotate in the mounting housing 41; the baffle plate 43 can rotate with the lock cylinder 42; the baffle plate 43 can move to the second position by rotation, and the baffle plate 43 relieves the blockage on the locking arm 2; the locking arm 2 can be rotated to the unlocked position, so that the locking arm 2 can be separated from the data interface by rotation to: relieve the clamping of the locking arm 2 and the side wall of the first opening 11 on the data interface and remove the lock case main body 1 from the data interface, and a user can read data by using the data interface; and meanwhile, due to the arrangement of the lock cylinder 42, a wrong key cannot switch the first locking members 411 to the unlocked state, so that this can prevent a criminal from unlocking the data interface to steal data.

In this embodiment, the lock cylinder 42 is provided with a key hole 421; each first locking member 411 includes a first locking pin 4111, a second locking pin 4112, and a first spring 4113; a first locking hole 4114 is provided in the mounting housing 41; a second locking hole 422 is provided in the lock cylinder 42; the first spring 4113 is arranged in the first locking hole 4114; one end of the first locking pin 4111 is connected to the first spring 4113; the second locking pin 4112 is inserted into the second locking hole 422; the other end of the first locking pin 4111 is abutted with the second locking pin 4112; a first joint 4115 is formed between the first locking pin 4111 and the second locking pin 4112; a second joint 4116 is formed at a connection between the lock cylinder 42 and the mounting housing 41; when the first joint 4115 is aligned with the second joint 4116, the first locking member 411 is in the unlocked state; two ends of the first locking pin 4111 are located in the first locking hole 4114; two ends of the second locking pin 4112 are located in the second locking hole 422; the lock cylinder 42 can rotate in the mounting housing 41, and the baffle plate 43 can rotate with the lock cylinder 42, so that the baffle plate 43 can rotate between the first position and the second position; when the first joint 4115 is misaligned with the second joint 4116, the first locking member 411 is in the locked state; one end of the first locking pin 4111 is inserted into the second locking hole 422, and the other end of the first locking pin 4111 is inserted into the first locking hole 4114, so that the lock cylinder 42 cannot rotate in the mounting housing 41; or, when the first joint 4115 is misaligned with the second joint 4116, the first locking member 411 is in the locked state; and one end of the second locking pin 4112 is inserted into the second locking hole 422, and the other end of the second locking pin 4112 is inserted into the first locking hole 4114, so that the lock cylinder 42 cannot rotate in the mounting housing 41. Through the above structure, only if a correct key is inserted into the lock cylinder 42, the first locking pin 4111 and the second locking pin 4112 can be pushed to correct positions to align the first joint 4115 with the second joint 4116, and the first locking member 411 can be switched to the unlocked state; the lock cylinder 42 can rotate in the mounting housing 41; the baffle plate 43 can rotate with the lock cylinder 42; the baffle plate 43 can move to the second position by rotation, and the baffle plate 43 relieves the blockage on the locking arm 2; the locking arm 2 can be rotated to the unlocked position, so that the locking arm 2 can be separated from the data interface by rotation to: relieve the clamping of the locking arm 2 and the side wall of the first opening 11 on the data interface and remove the lock case main body 1 from the data interface, and a user can read data by using the data interface; and meanwhile, due to the arrangement of the lock cylinder 42, a wrong key cannot align the first joint 4115 with the second joint 4116 and cannot switch the first locking member 411 to the unlocked state, so that this can prevent a criminal from unlocking the data interface to steal data.

In this embodiment, lengths of the first locking pins 4111 of the several first locking members 411 are the same, and lengths of the second locking pins 4112 of the several first locking members 411 are different from one another. Through the above structure, due to the different lengths of the second locking pins 4112 of the several first locking members 411, this combination makes the structure of the lock cylinder 42 more complex, which further improves the security of the lock cylinder 42. Only the correct key can simultaneously open the several first locking members 411 to prevent criminals from unlocking the data interface and stealing data.

In this embodiment, the locking arm 2 is provided with a first end 21, a second end 22, a rotating shaft 23, and a connecting end 24 located between the first end 21 and the second end 22, and the connecting end 24 is rotatably connected to the lock case main body 1 through the rotating shaft 23. When the baffle plate 43 moves to the first position, the baffle plate 43 pushes and blocks the first end 21 in a direction facing away from the side wall of the first opening 11 to push and block the second end 22 in a direction close to the side wall of the first opening 11; the second end 22 of the locking arm 2 is blocked and locked in the locked position; the second end 22 of the locking arm 2 clamps the data interface together with the side wall of the first opening 11; when the baffle plate 43 moves to the second position, the baffle plate 43 relieves the blockage on the locking arm 2, so that the first end 21 can rotate in the direction close to the side wall of the first opening 11; and the second end 22 can rotate to the unlocked position in the direction facing away from the side wall of the first opening 11, so that the second end 22 is separated from the data interface to relieve the clamping of the second end 22 of the locking arm 2 on the data interface. Specifically, the lock case main body 1 is further provided with an avoidance slot 1211; when the baffle plate 43) moves to the first position, the baffle plate 43 is located in the avoidance slot 1211; the baffle plate 43 pushes and blocks the first end 21 in the direction facing away from the side wall of the first opening 11 to push the second end 22 in the direction close to the side wall of the first opening 11; the first end 21 cannot rotate into the avoidance slot 1211; when the baffle plate 43 moves to the second position, the baffle plate 43 moves out of the avoidance slot 1211; the baffle plate 43 relieves the blockage on the locking arm 2, so that the first end 21 can rotate into the avoidance slot 1211 in the direction close to the side wall of the first opening 11; and the second end 22 can rotate to the unlocked position in the direction facing away from the side wall of the first opening 11, so that the second end 22 is separated from the data interface and relieves the clamping of the second end 22 of the locking arm 2 on the data interface. Further, the elastic reset device 3 is connected to the rotating shaft 23. Still further, the elastic reset device 3 is a torsion spring; the torsion spring is provided with a first sleeving opening 31; the torsion spring sleeves the rotating shaft 23 through the first sleeving opening 31; the first opening 11 is further provided with a limiting column 111 on the side wall; the torsion spring is provided with a first elastic arm 32 and a second elastic arm 33; the second elastic arm 33 is located between the second end 22 and the limiting column 111; the first elastic arm 32 pushes the first end 21 in the direction facing away from the side wall of the first opening 11) to push the second end 22 in the direction close to the side wall of the first opening 11; and the second end 22 clamps the data interface together with the side wall of the first opening 11. Still further, the second end 22 of the locking arm 2 is provided with a first hook portion 221; and when the locking arm 2 is rotated to the locked position, the first hook portion 221 is connected to a first hook fitting portion 2221 of the data interface. Through the above structure, when the locking arm 2 is rotated to the locked position, the first hook portion 221 is connected to the first hook fitting portion 2221 of the data interface, which can better clamp the data interface by the second end 22 and the side wall of the first opening 11, and prevent the lock case main body 1 from being separated from the data interface. Furthermore, when the baffle plate 43 moves to the second position, the baffle plate 43 moves out of the avoidance slot 1211; the baffle plate 43 relieves the blockage on the locking arm 2, so that a user can press the first end 21 to cause the first end 21 to rotate into the avoidance slot 1211 in the direction close to the side wall of the first opening 11; and the second end 22 can rotate to the unlocked position in the direction facing away from the side wall of the first opening 11, so that the second end 22 is separated from the data interface and relieves the clamping of the second end 22 of the locking arm 2 on the data interface to remove the lock case main body 1 from the data interface. This facilitates the user to read data. Common OBD data interfaces on the market all have the first hook fitting portion. By connecting the first hook portion to the first hook fitting portion, the locking arm and the side wall of the first opening can better clamp the data interface.

In this embodiment, a second positioning groove 211 is provided at the first end 21 of the locking arm 2; when the baffle plate 43 moves to the first position, the baffle plate 43 resists against an inner wall of the second positioning groove 211; the baffle plate 43 pushes and blocks the first end 21 in a direction facing away from the side wall of the first opening 11 to push and block the second end 22 in a direction close to the side wall of the first opening 11; the second end 22 of the locking arm 2 is blocked and locked in the locked position; and the second end 22 of the locking arm 2 clamps the data interface together with the side wall of the first opening 11. Through the above structure, the baffle plate 43 can rotate in the second positioning groove 211, so that the baffle plate 43 can move between the first position and the second position by rotation.

In this embodiment, the data interface is an OBD data interface. Through the above structure, the OBD data interface is standard for every gasoline vehicle and has the same size. Regardless of a vehicle model, the OBD data interface is only provided at different points. It may be at all directions of the vehicle. Relevant data of a vehicle can be read through the OBD data interface of the vehicle. To prevent criminals from stealing a vehicle or modifying data, such as mileage, of a vehicle, through the OBD data interface using a device fitting key, a lock for a data interface needs to be arranged at the OBD data interface to achieve an anti-theft effect.

In this embodiment, a second sleeving opening 431 is provided on the baffle plate 43, and the baffle plate 43 sleeves the lock cylinder 42 through the second sleeving opening 431. The second opening 13 is provided with a first positioning protrusion 131 on an inner wall; a first positioning groove 412 is provided on an outer side wall of the mounting housing 41; the first positioning groove 412 is connected to the first positioning protrusion 131; or, the second opening 13 is provided with a first positioning groove 412 on an inner wall; a first positioning protrusion 131 is arranged on an outer side wall of the mounting housing 41; and the first positioning groove 412 is connected to the first positioning protrusion 131. Specifically, the mounting housing 41 includes a first mounting portion 413 and a second mounting portion 414; the first mounting portion 413 is provided with a first flange 4131; the second mounting portion 414 is provided with a second flange 4132; the second mounting portion 414 detachably sleeves the first mounting portion 413 to form the first positioning groove 412 between the first flange 4131 and the second flange 4132; and the second flange 4132 compresses the first positioning protrusion 131 onto the first flange 4131. Further, the second mounting portion 414 is in threaded connection to the first mounting portion 413. Still further, the lock case main body 1 includes an upper case 14 and a lower case 15; and the upper case 14 is detachably connected to the lower case 15. Still further, the upper case 14 is connected to the lower case 15 through a buckle 1511. Through the above structure, the design is reasonable, and the structure is simple; and mounting of the lock cylinder 42 and the baffle plate 43 is effectively achieved.

A lock for an OBD data interface includes:

a lock case main body 1, wherein the lock case main body 1 is provided with a first opening 11, and the first opening 11 is configured to sleeve a data interface;

a locking arm 2, wherein the locking arm 2 is rotatably connected to the lock case main body 1; the locking arm 2 can be moved between a locked position and an unlocked position by rotation;

an elastic reset device 3, wherein the elastic reset device 3 is connected to the locking arm 2 to push and reset the locking arm 2 to the locked position, so that the locking arm 2 clamps the data interface together with a side wall of the first opening 11;

a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position.

Through the above structure, the lock includes: a lock case main body 1, wherein the lock case main body 1 is provided with a first opening 11, and the first opening 11 is configured to sleeve a data interface; a locking arm 2, wherein the locking arm 2 is rotatably connected to the lock case main body 1; the locking arm 2 can be moved between a locked position and an unlocked position by rotation; an elastic reset device 3, wherein the elastic reset device 3 is connected to the locking arm 2 to push and reset the locking arm 2 to the locked position, so that the locking arm 2 clamps the data interface together with a side wall of the first opening 11; a locking device 4, wherein the locking device 4 is connected to the lock case main body 1; the locking device 4 is configured to lock the locking arm 2; when the locking device 4 is in an unlocked state, the locking arm 2 can be moved between the locked position and the unlocked position by rotation; and when the locking device 4 is in a locked state, the locking arm 2 cannot be rotated, and the locking device 4 locks the locking arm 2 in the locked position. Therefore, a user can use the locking device 4 to lock the locking arm 2, and lock the locking arm 2 in the locked position, so that the locking arm 2 and the side wall of the first opening 11 clamp the data interface, and the lock case main body 1 closes the data interface, thereby preventing criminals from stealing data through the data interface. When a user needs to read data, the user can relieve the locking of the locking device 4 on the locking arm 2, so that the locking device 4 is in the unlocked state, and the locking arm 2 can be rotated to the unlocked position. Thus, the locking arm 2 can be separated from the data interface by rotation, so as to relieve the clamping of the locking arm 2 and the side wall of the first opening 11 on the data interface, which removes the lock case main body 1 from the data interface, and the user can read the data using the data interface. Furthermore, the OBD data interface is standard for every gasoline vehicle and has the same size. Regardless of a vehicle model, the OBD data interface is only provided at different points. It may be at all directions of the vehicle. Relevant data of a vehicle can be read through the OBD data interface of the vehicle. To prevent criminals from stealing a vehicle or modifying data, such as mileage, of a vehicle, through the OBD data interface using a device fitting key, a lock for a data interface needs to be arranged at the OBD data interface to achieve an anti-theft effect.

Second Embodiment

The second embodiment does not include the locking arm 2 and the elastic reset device 3 in the first embodiment, and remaining structures of the second embodiment are substantially identical to those in the first embodiment. The difference is as follows. Referring to FIG. 9 to FIG. 12, an upper case 14 and a lower case 15 of a lock case main body 1 are detachably connected via a locking device 4.

Figure 2:
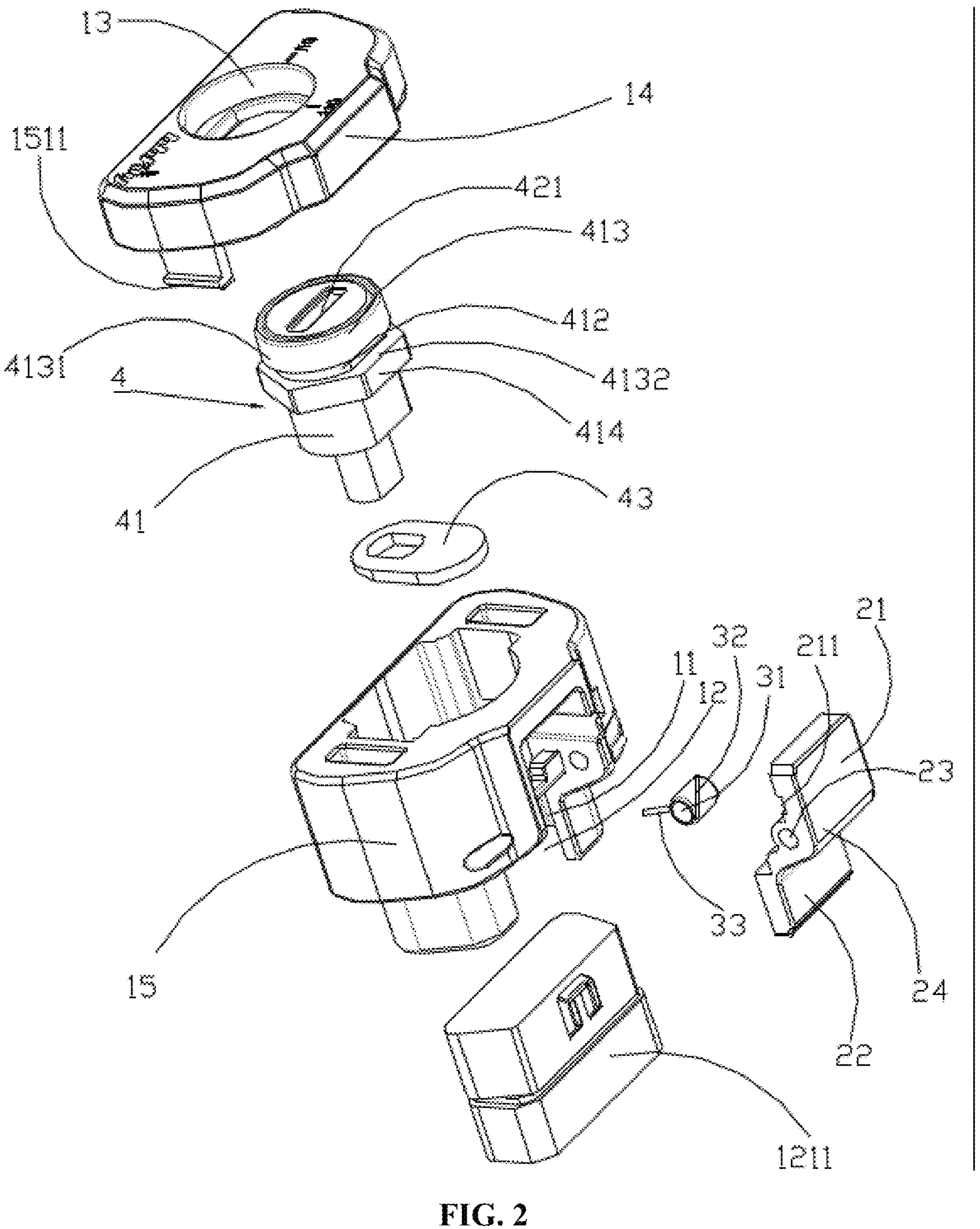
FIG. 2 is an exploded view of the first embodiment of the present disclosure.
Figure 3:
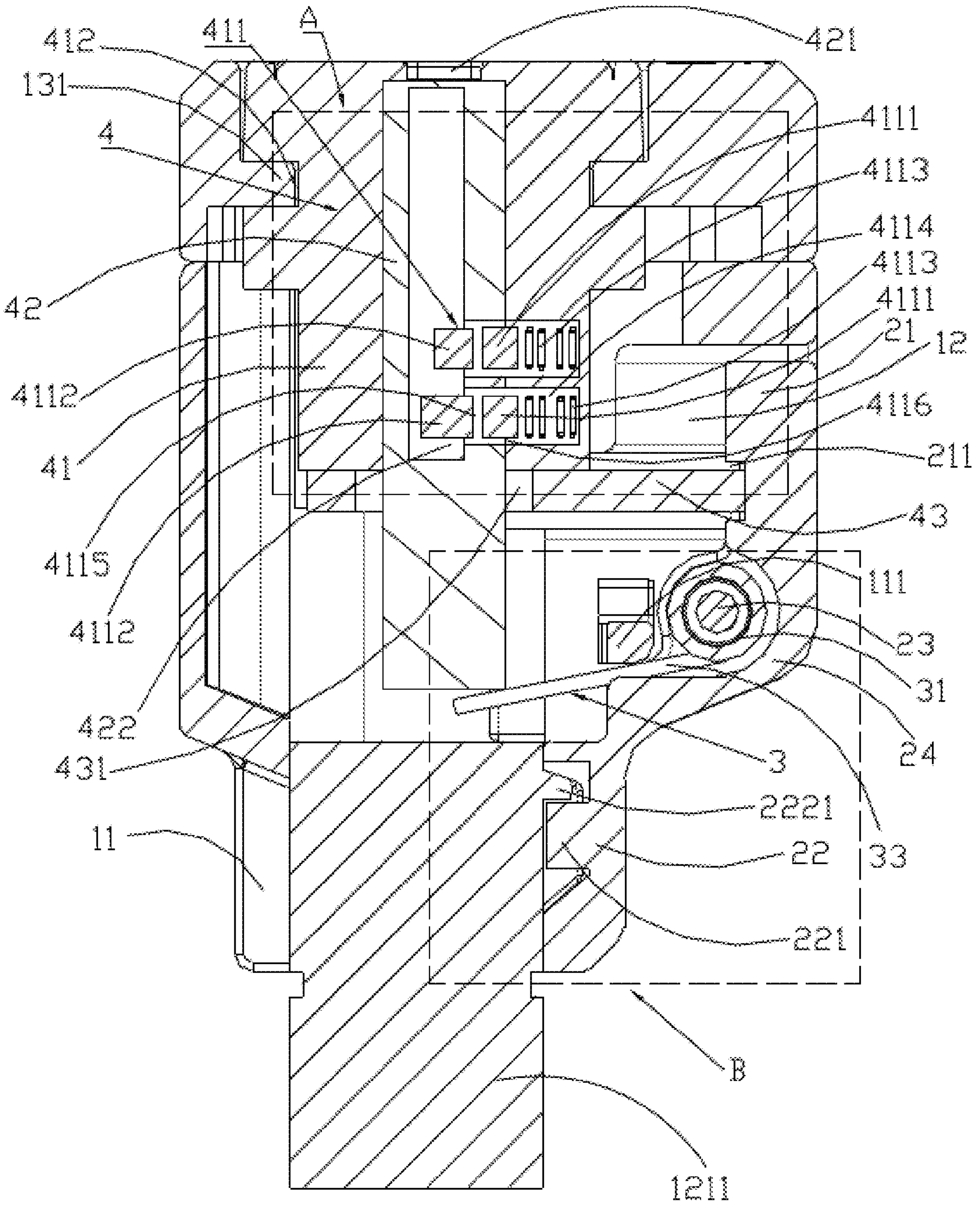
FIG. 3 is a sectional view cut away along a lock cylinder, showing: When the first joint and the second joint are misaligned, the first locking member is in the locked state; one end of the first locking pin is inserted into the second locking hole, and the other end of the first locking pin is inserted into the first locking hole; the lock cylinder cannot rotate in the mounting housing, and the baffle plate is located in the first position to push and block the first end in the direction facing away from the side wall of the first opening, so as to push and block the second end in the direction close to the side wall of the first opening; the second end of the locking arm is stopped and blocked at the locked position to clamp the data interface.
Figure 4:
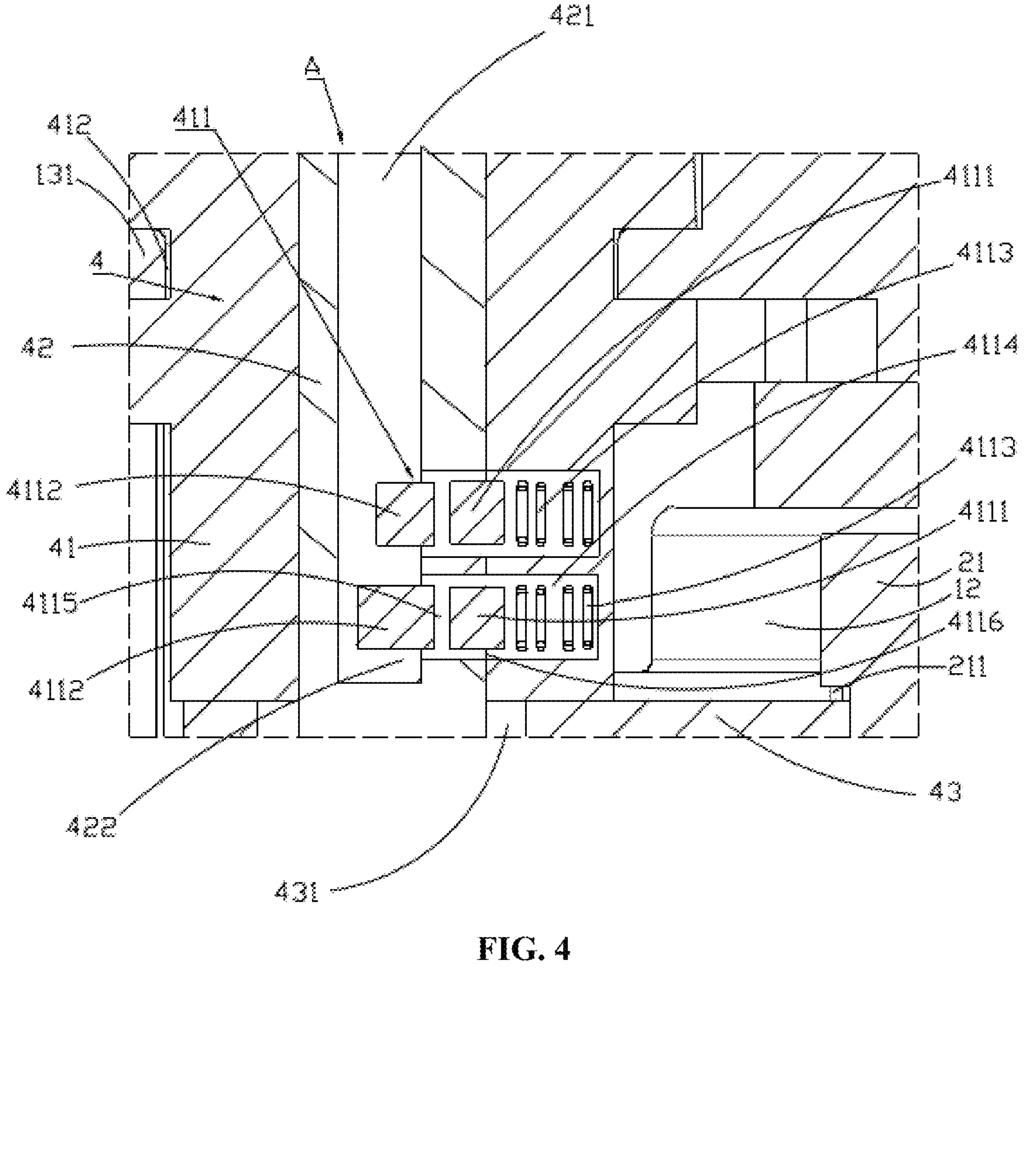
FIG. 4 is an enlarged view of the part A in FIG. 3.
Figure 5:
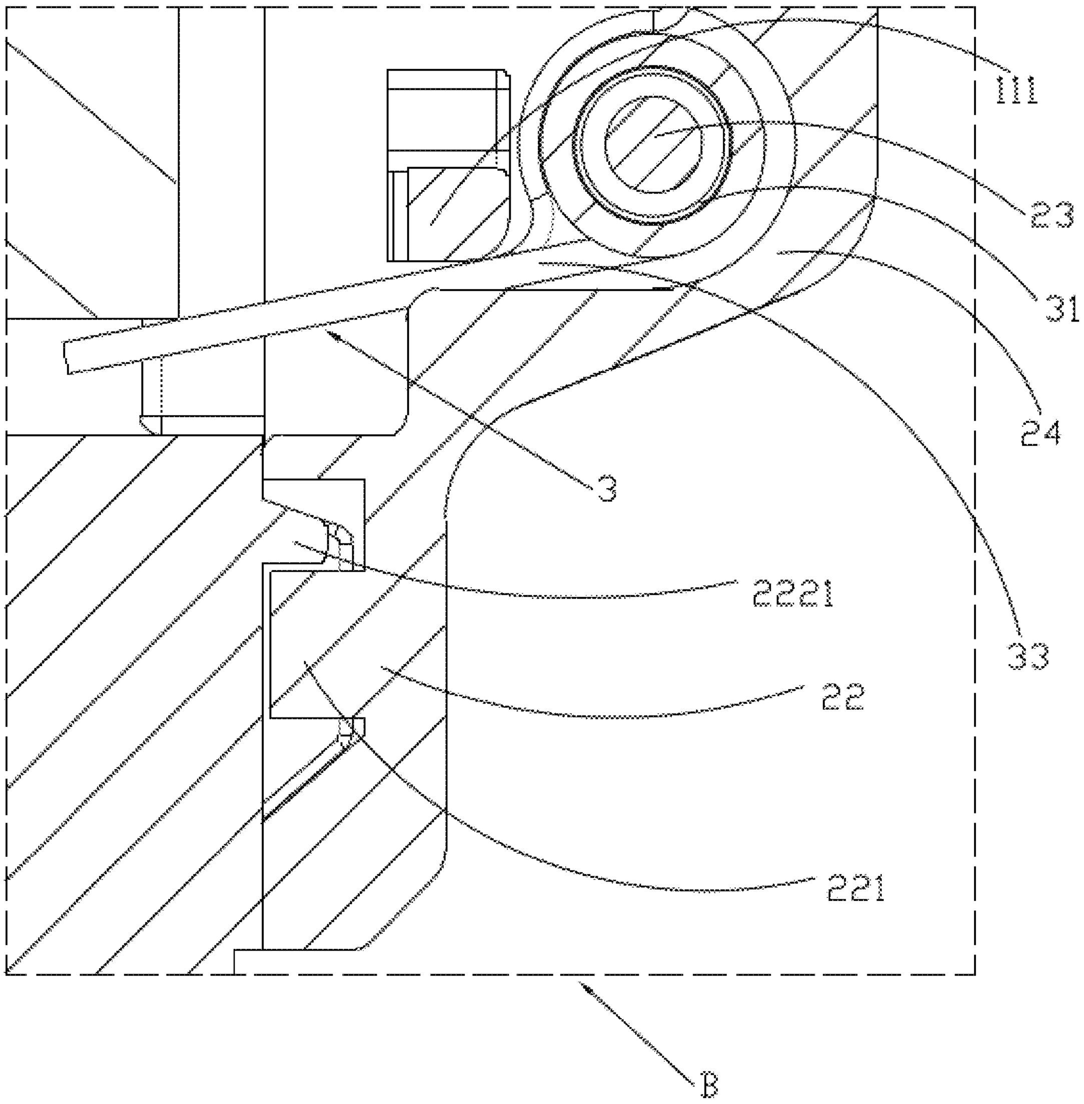
FIG. 5 is an enlarged view of the part B in FIG. 3.
Figure 6:
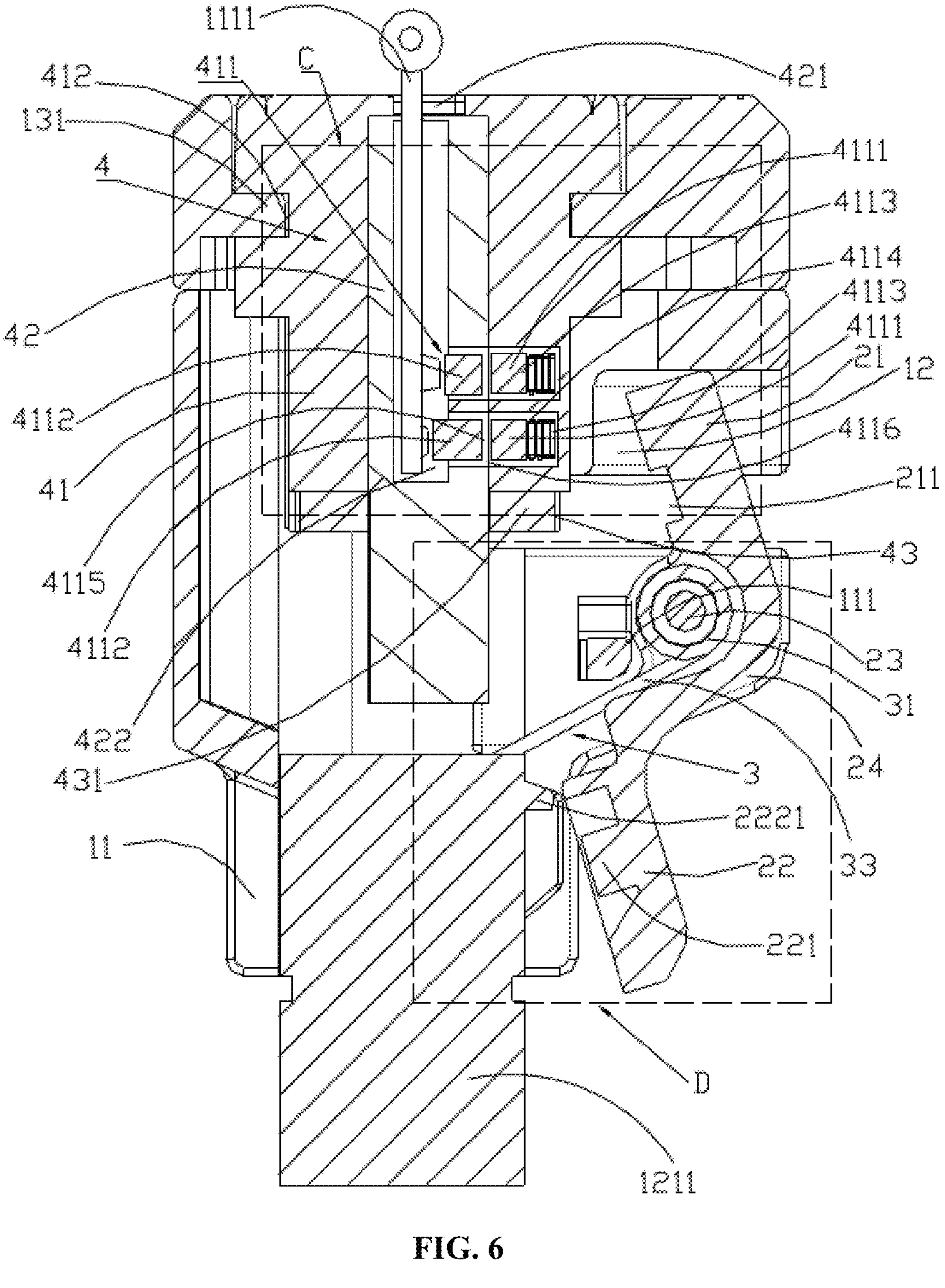
FIG. 6 is a sectional view cut away along a lock cylinder, showing: When a key is inserted to push the second locking pin, the first joint is aligned with the second joint, and the first locking member is in the unlocked state; two ends of the first locking pin are located in the first locking hole, and two ends of the second locking pin are located in the second locking hole; the lock cylinder can rotate in the mounting housing; the baffle plate can rotate with the lock cylinder; the baffle plate rotates to the second position and relieves the blockage on the locking arm; the first end can rotate into the avoidance slot in the direction close to the side wall of the first opening, and the second end can rotate to the unlocked position in the direction facing away from the first opening; the second end is separated from the data interface, thus relieving the clamping of the second end of the locking arm on the data interface.
Figure 7:
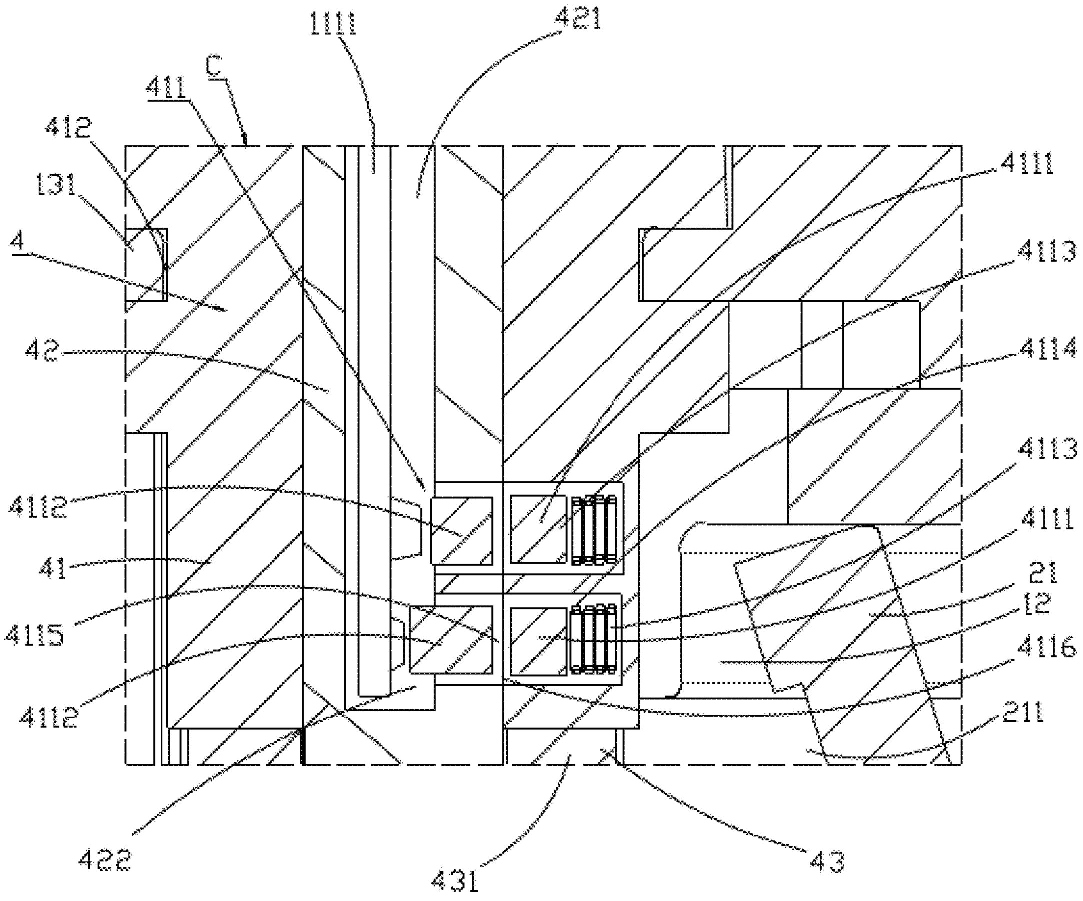
FIG. 7 is an enlarged view of the part C in FIG. 6.
Figure 8:
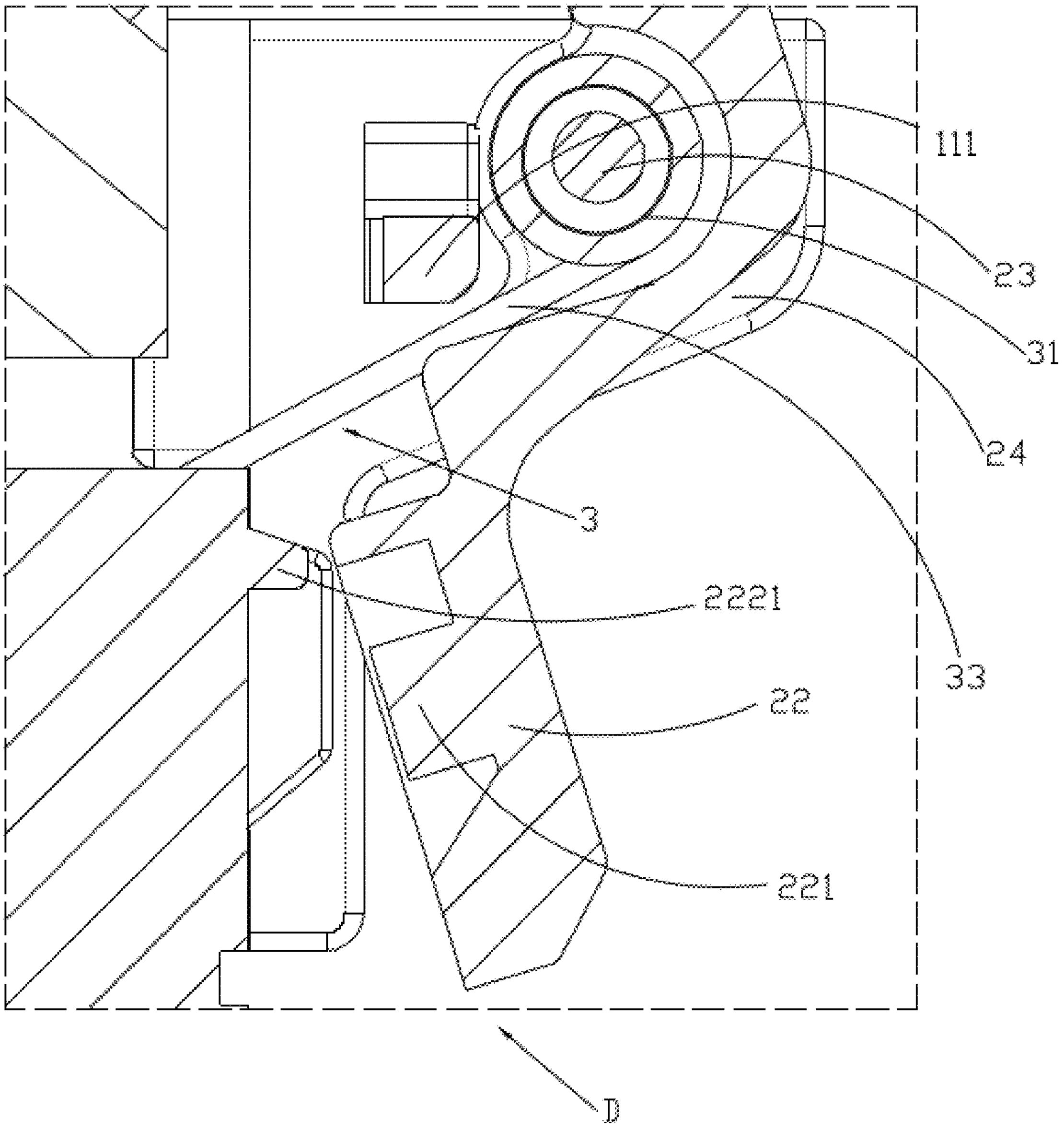
FIG. 8 is an enlarged view of the part D in FIG. 6.
Figure 9:
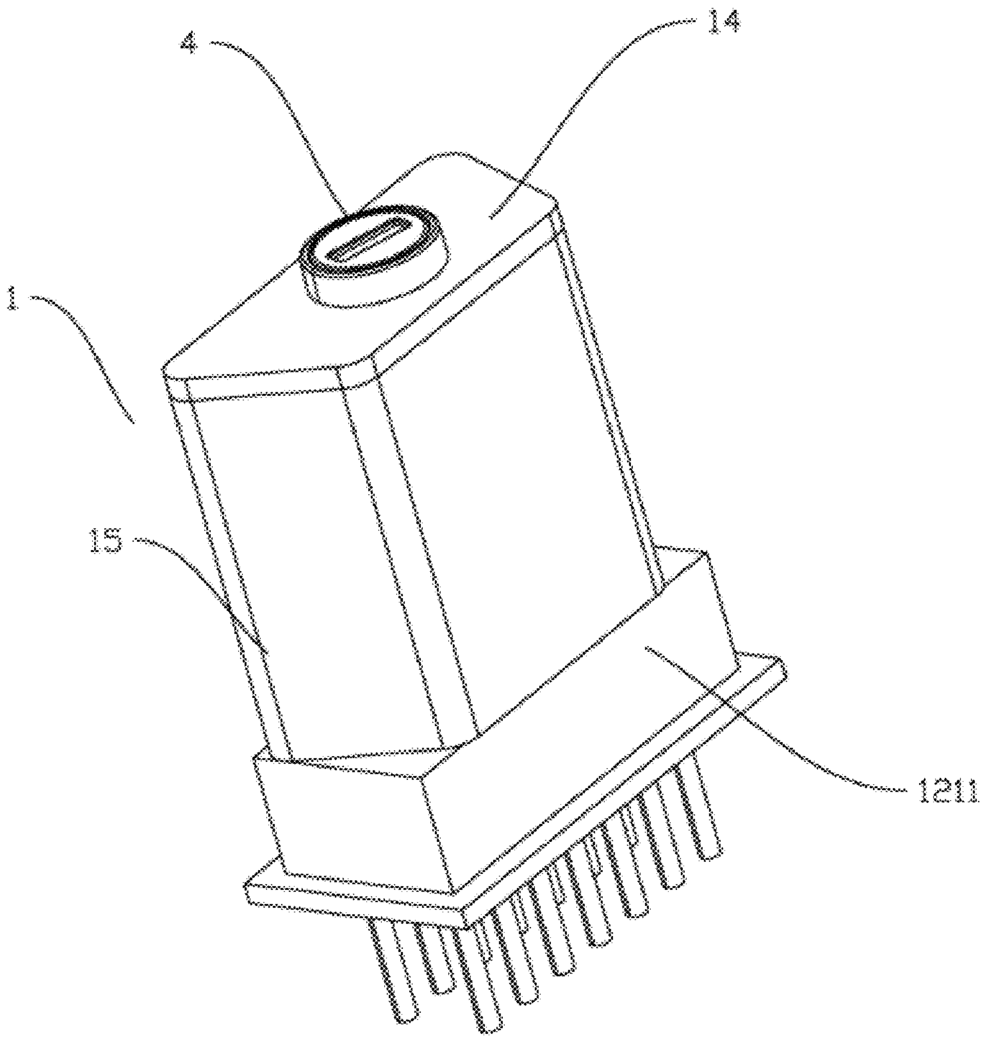
FIG. 9 is a schematic diagram of an overall structure according to a second embodiment of the present disclosure.
Figure 10:
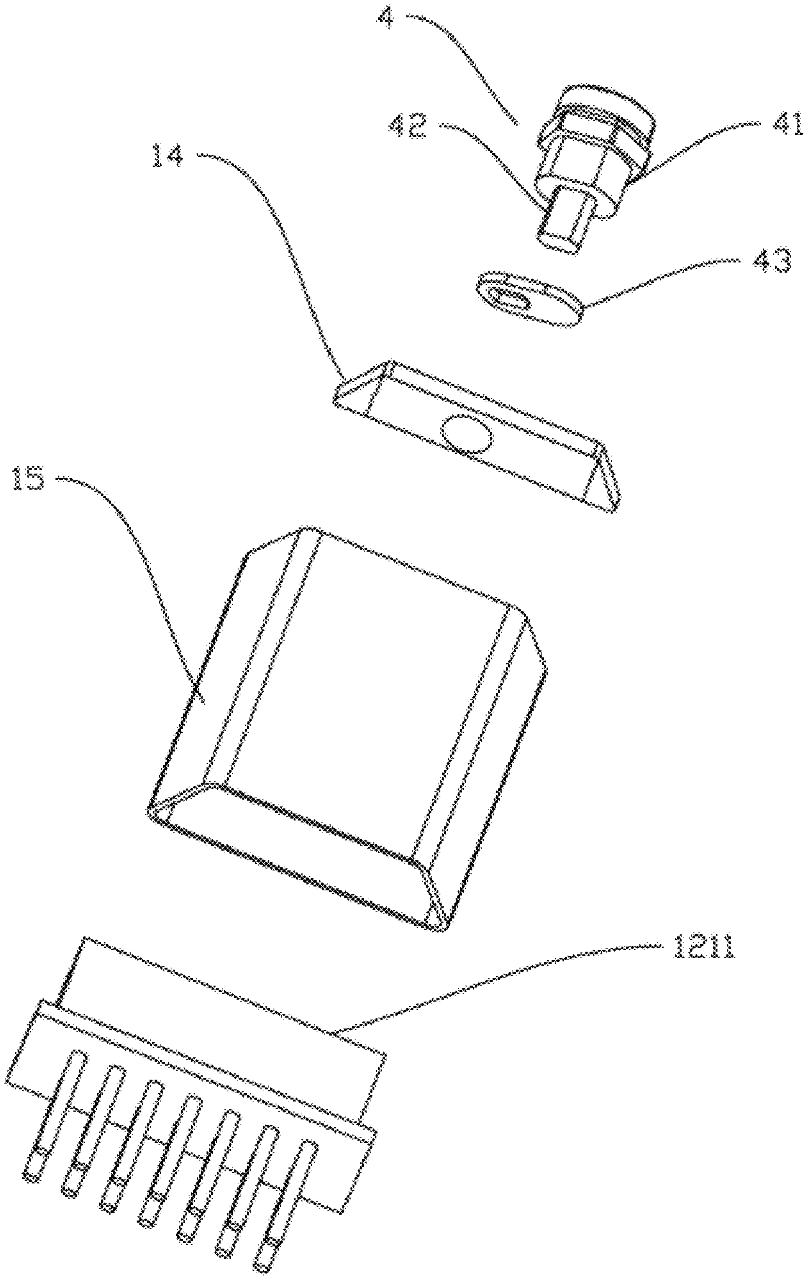
FIG. 10 is an exploded view of the second embodiment of the present disclosure.

Referring to FIG. 2 to FIG. 3, the upper case 14 of the lock case main body 1 is further provided with a second opening 13. The locking device 4 includes a mounting housing 41, a lock cylinder 42 and a baffle plate 43. The mounting housing 41 is mounted on the second opening 13. The lock cylinder 42 is rotatably provided in the mounting housing 41. The baffle plate 43 is sleeved on the lock cylinder 42. The baffle 43 is capable of rotating with the lock cylinder 42, so that the baffle 43 is movable between a first position and a second position. When the baffle plate 43 moves to the first position, the baffle plate 43 is configured for locking the upper case 14 to the lower case 15; and when the baffle plate 43 moves to the second position, the baffle plate 43 is configured for releasing the lock between the upper case 14 and the lower case 15.

Figure 11:
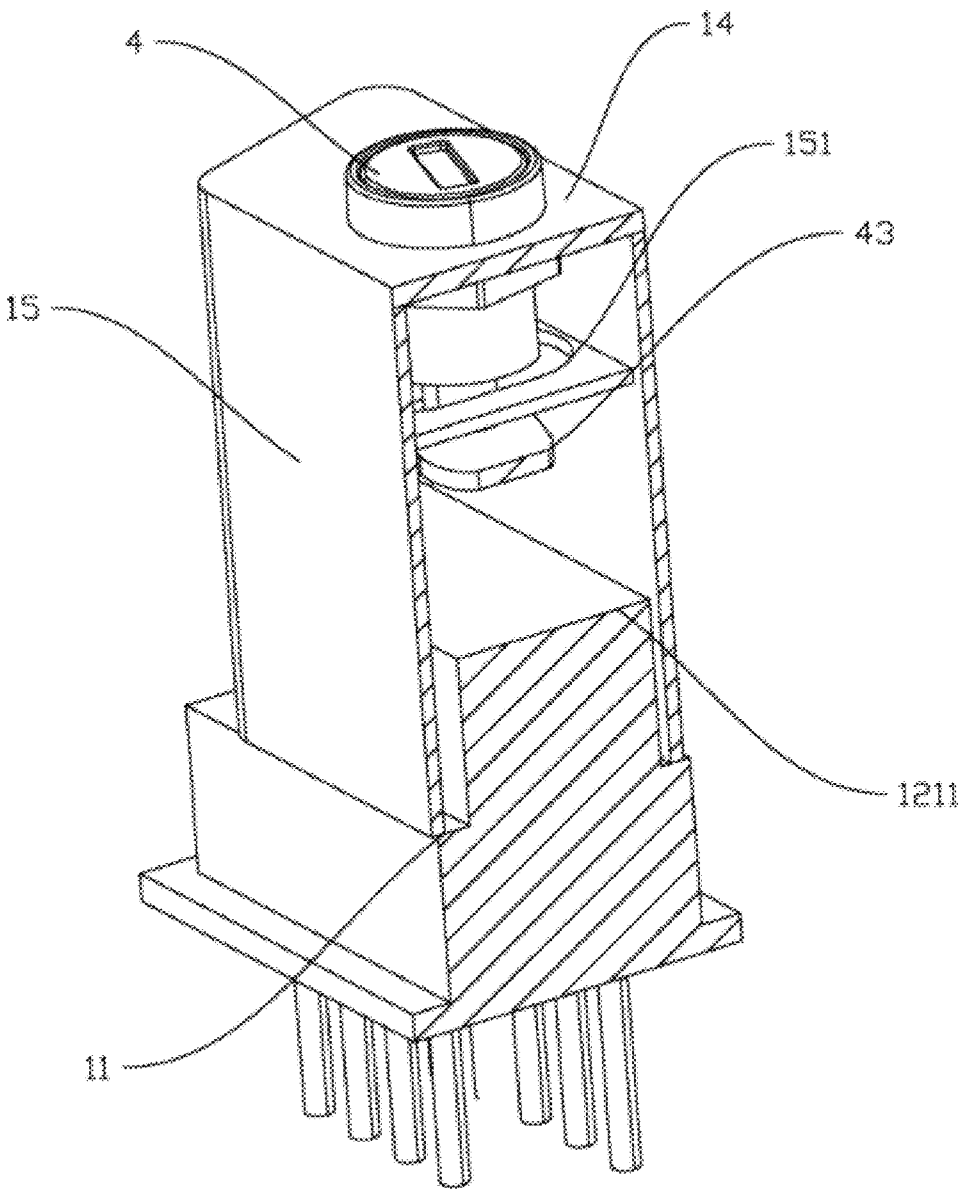
FIG. 11 is a schematic diagram of a cross-sectional structure according to the second embodiment of the present disclosure under a locked state.
Figure 12:
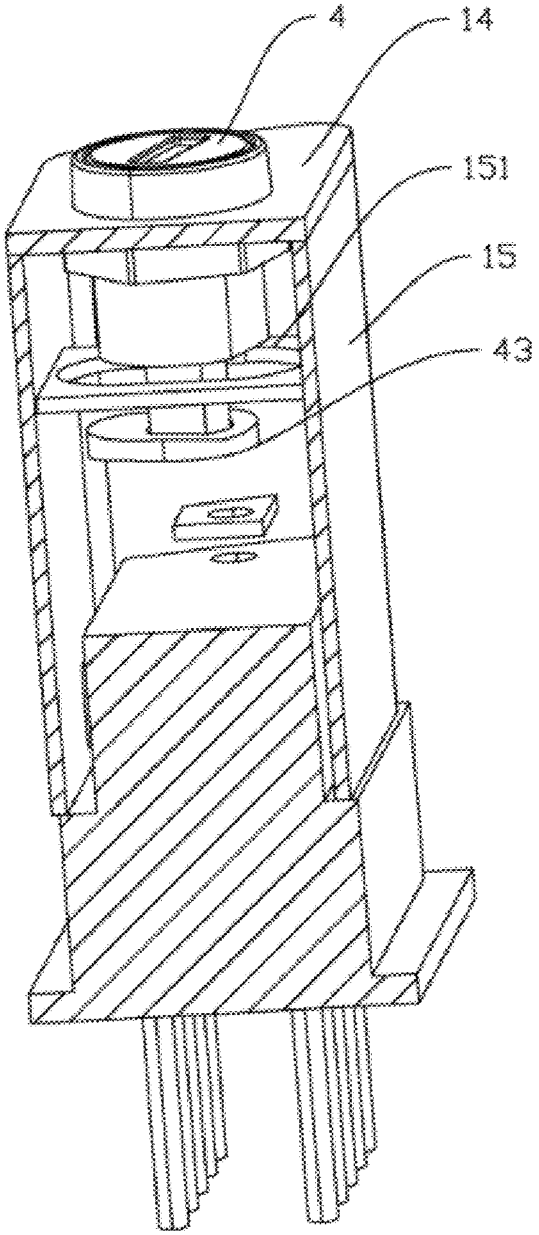
FIG. 12 is a schematic diagram of a cross-sectional structure according to the second embodiment of the present disclosure under an unlocked state.
Figure 13:
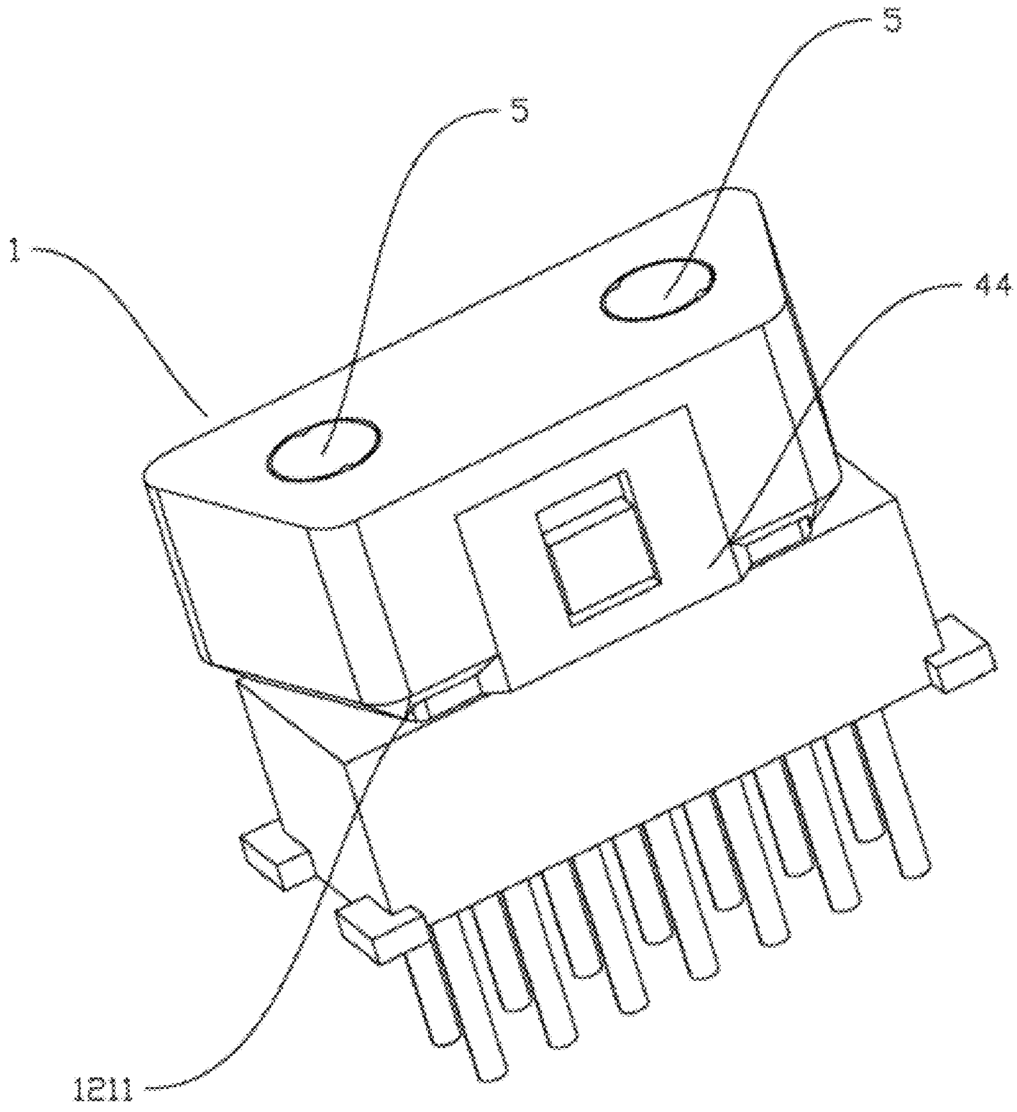
FIG. 13 is a schematic diagram of an overall structure according to a third embodiment of the present disclosure.

In the present embodiment, referring to FIG. 11 to FIG. 12, a stop portion 151 extends out from the lower case 15. When the baffle plate 43 moves to the first position, the stop portion 151 stops the baffle plate 43 in the lower case 15 to lock the upper case 14 to the lower case 15.

Through the described structure above, the upper case 14 and the lower case 15 are locked and connected through the locking device 4, so that the upper case 14 and the lower case 15 are stably and reliably connected, thereby effectively preventing unauthorized personnel from damaging the lock case main body 1 to steal data. Moreover, the locking device 4 is mounted in the lock case main body 1 via the second opening 13, and the built-in locking device 4 is not easy to be directly pried by an external force such as a pair of pliers and a hammer, with high safety performance.

Third Embodiment

Figure 14:
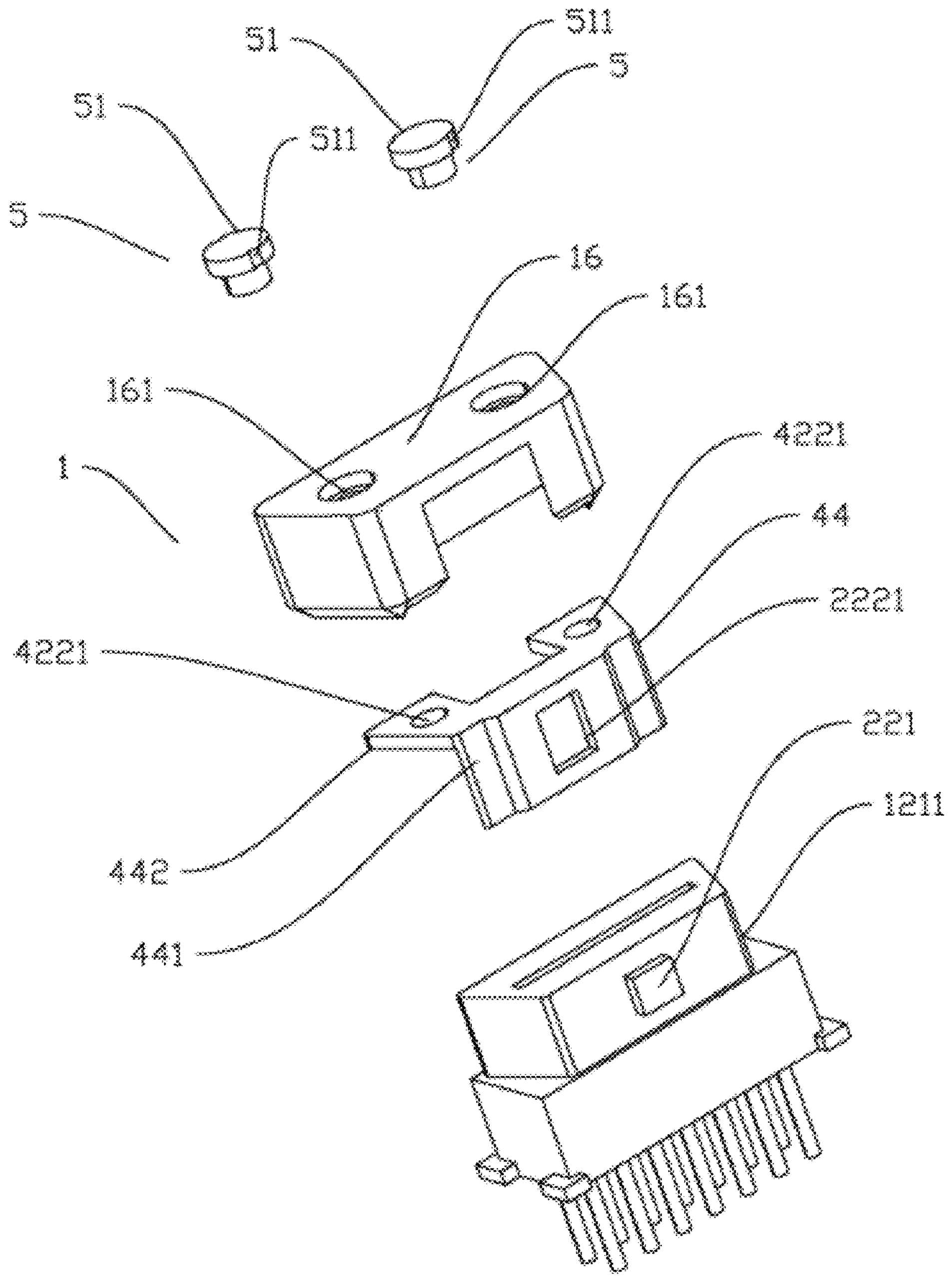
FIG. 14 is an exploded view of the third embodiment of the present disclosure.
Figure 15:
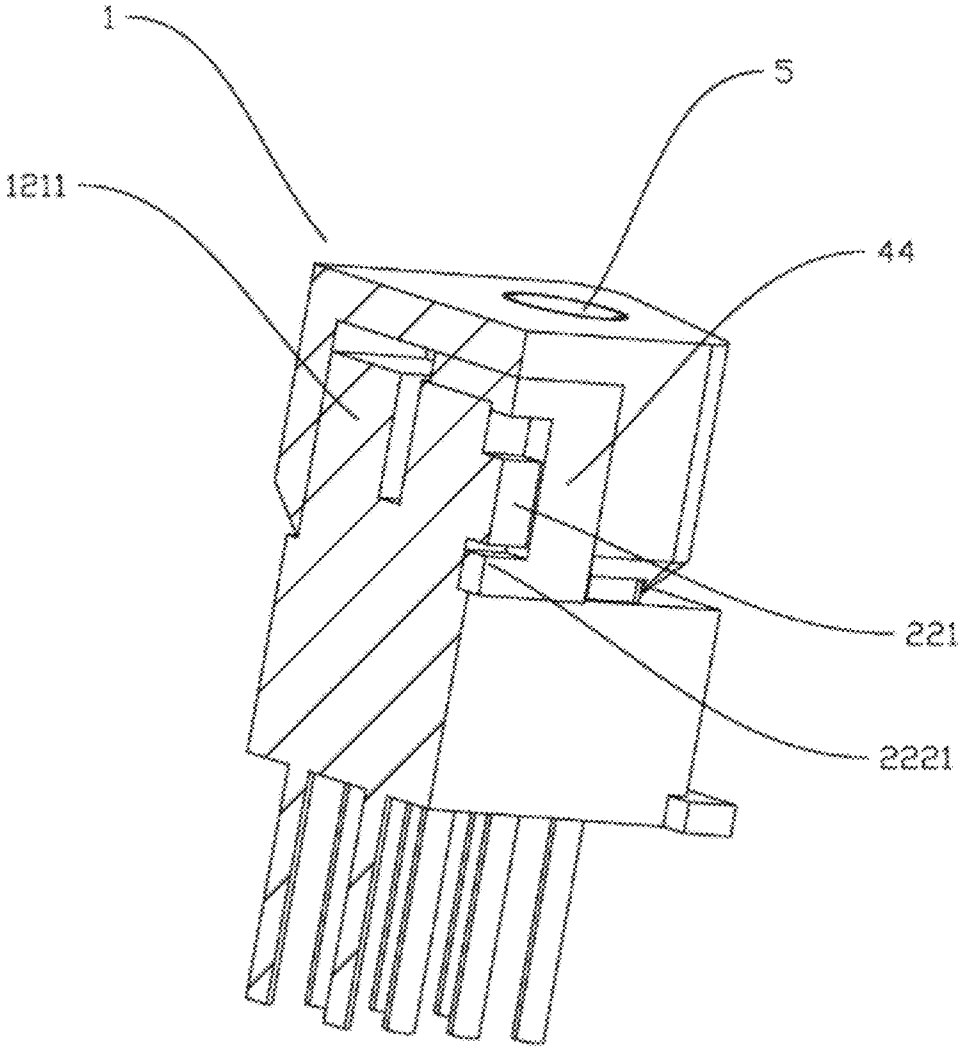
FIG. 15 is a schematic diagram of a cross-sectional structure according to the third embodiment of the present disclosure.
Figure 16:
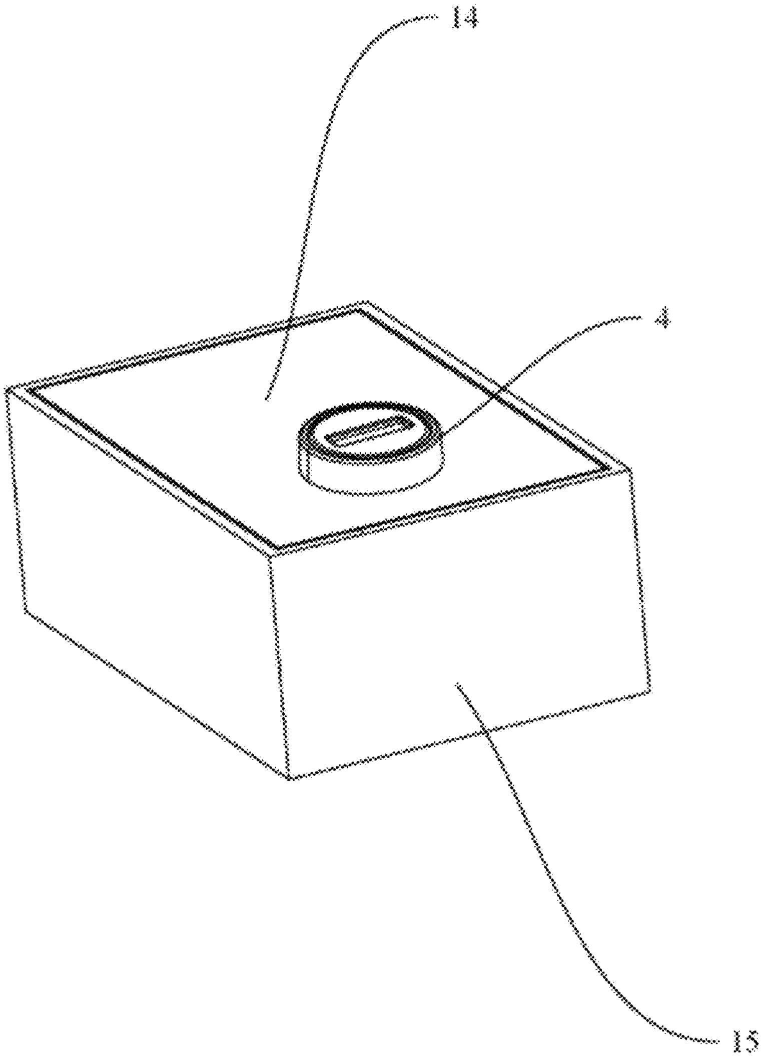
FIG. 16 is a schematic diagram of an overall structure of a fourth embodiment of the present disclosure.
Figure 17:
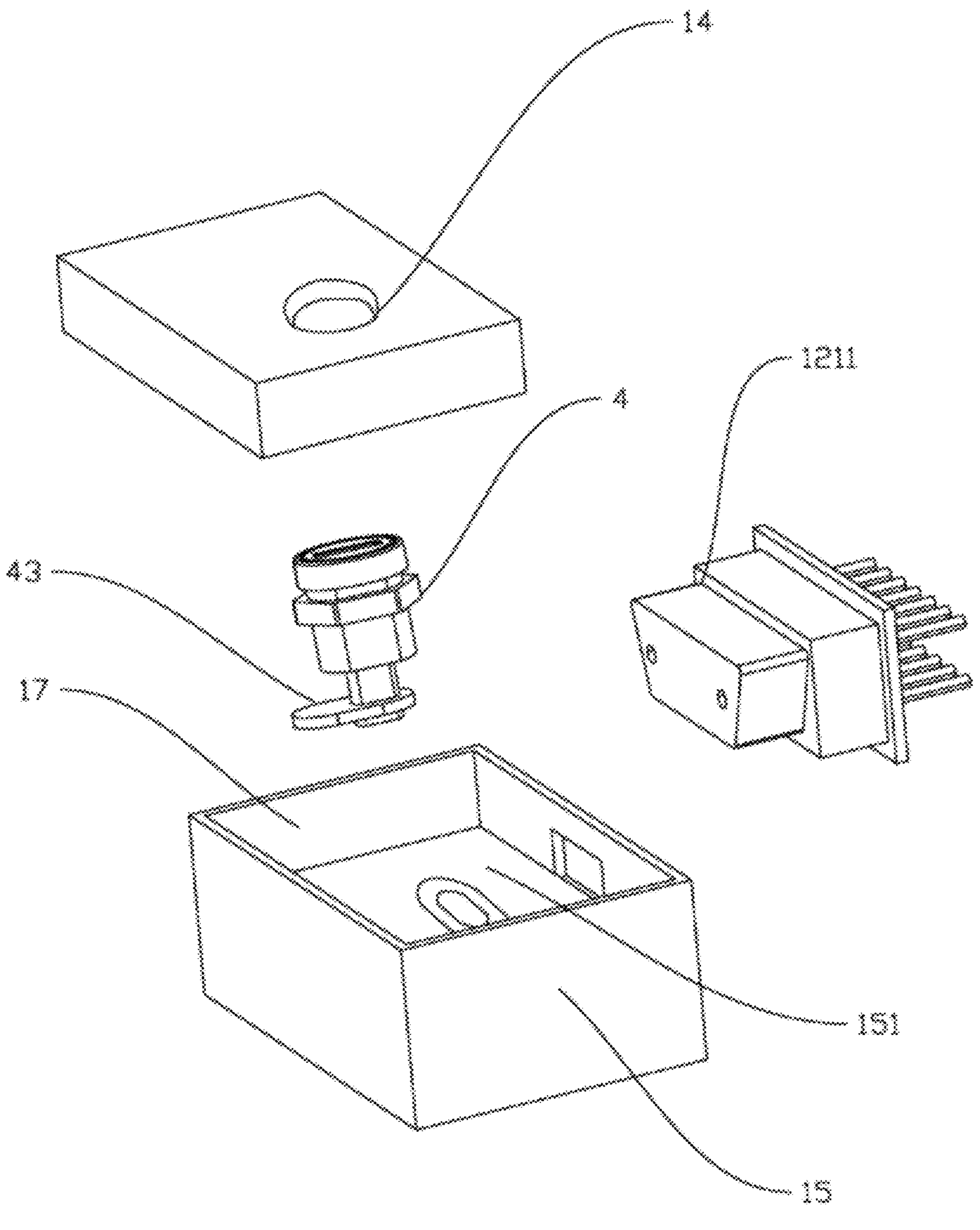
FIG. 17 is an exploded view of the fourth embodiment of the present disclosure.
Figure 18:
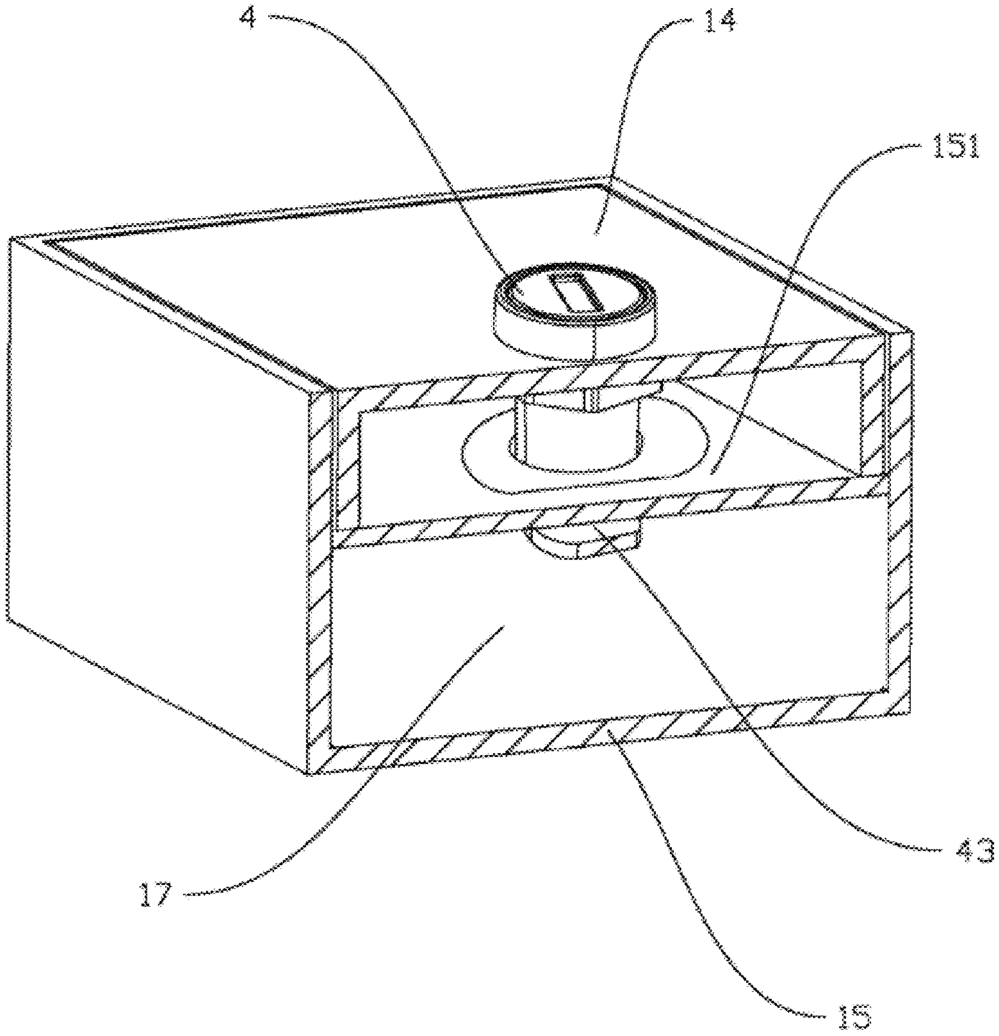
FIG. 18 is a schematic diagram of a cross-sectional structure according to the fourth embodiment of the present disclosure under the locked state.
Figure 19:
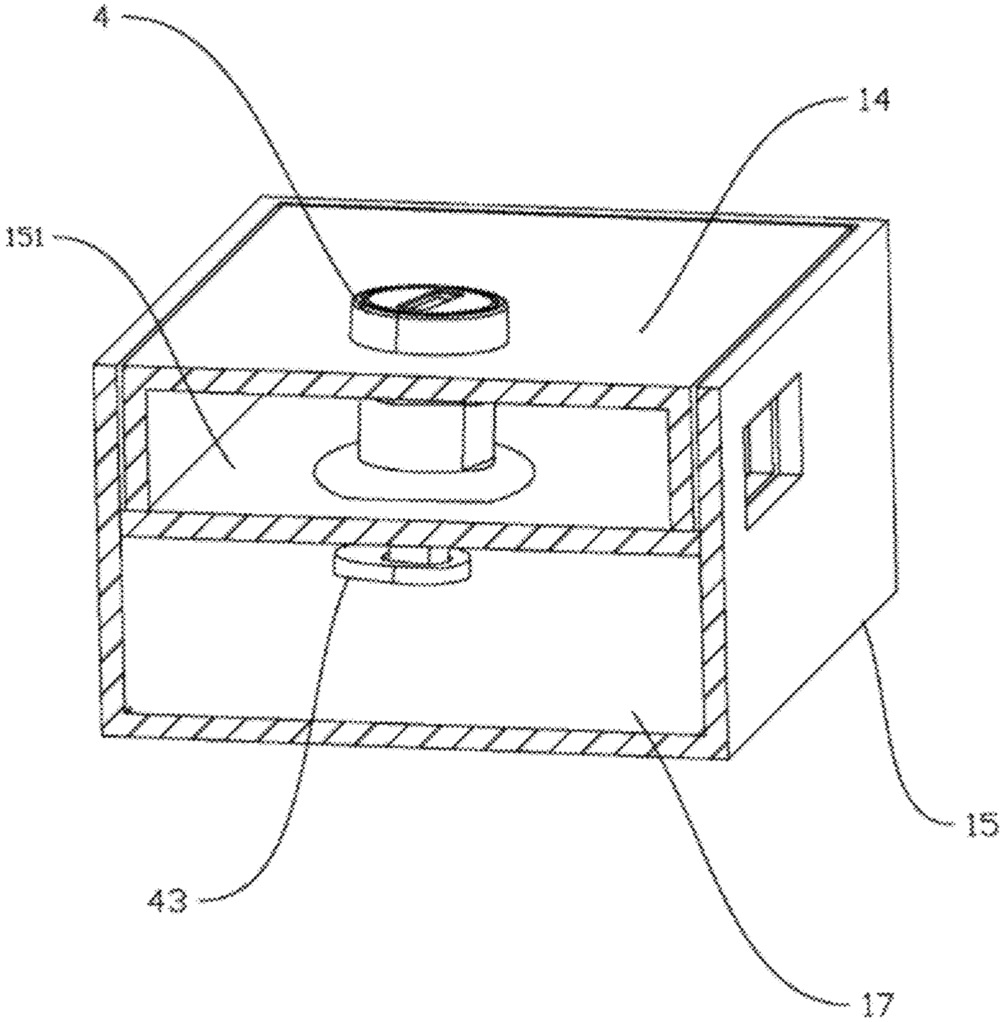
FIG. 19 is a schematic diagram of a cross-sectional structure according to the fourth embodiment of the present disclosure under the unlocked state.

The third embodiment and the second embodiment do not include the locking arm 2 and the elastic reset device 3, and remaining structures of the third embodiment are substantially identical to those in the first embodiment, and the differences are as follows. Referring to FIGS. 14 to 15, the locking device 4 of the present embodiment includes a locking mounting block 44. A first opening 11 of the lock case main body 1 is sleeved on the locking mounting block 44 and a data interface 1211. The locking mounting block 44 is positioned between an inner wall of the lock case main body 1 and the data interface 2, so that the inner wall of the first opening 11 stops the locking mounting block 44 on a side wall of the data interface. The lock case main body 1 is connected to the locking mounting block 44, and the connection is configured for connecting the lock case main body 1 and the locking mounting block 44 to the data interface 1211 to form a whole. Through the described structure above, the inner wall of the first opening 11 forms a stop effect on the locking mounting block 44, thereby effectively preventing the locking device 4 from loosening or falling off during use. Moreover, the lock case main body 1 and the locking mounting block 44 are connected to the data interface to form a whole, improving an overall strength and anti-seismic performance of the device, and effectively preventing the external force from causing damage to the data interface.

In the present embodiment, the lock case main body 1 is detachably connected to the locking mounting block 44. The described structure above enables the user to detach, install and replace the locking mounting block 44 according to different requirements and facilitates a later maintenance, replacement, or an upgrade of a data interface.

In the present embodiment, the locking mounting block 44 is provided with a first hook fitting portion 2221. The first hook fitting portion 2221 is connected to a first hook portion 221 of the data interface side wall. The inner wall of the first opening 11 stops the first hook fitting portion 2221 of the locking mounting block 44 against the first hook portion 221 of the data interface. The first hook fitting portion 2221 and the first hook portion 221 of the data interface can be accurately engaged with each other for installation, enabling the locking mounting block 44 to be accurately positioned during the installation process, and avoiding misalignment or displacement.

Quite usefully, the first hook fitting portion 2221 is a limiting opening, and the first hook portion 221 is a protruding barb. The protruding barb is mounted in the limiting opening, so that the locking mounting block 44 is connected to the data interface.

In the present embodiment, the lock case main body 1 and the locking mounting block 44 are detachably connected through a screw 5 or a buckle or a rivet or a mortise-and-tenon joint or a bolt. Quite usefully, the lock case main body 1 and the locking mounting block 44 are detachably connected by screws 5, and the screw 5 is positioned in the lock case main body 1. Herein, the screw connection has good mechanical strength and anti-vibration performance, able to effectively prevent the lock case main body 1 and the locking mounting block 44 from loosening or falling off during use. Moreover, arranging the screw 5 in the lock case main body 1 avoids scratching, accidental touch or external force interference that may be caused by an exposed screw, improving the usage safety of the device.

In the present embodiment, the locking mounting block 44 is provided with a connecting side wall 441 and a top cover portion 442. The connecting side wall 441 is connected to the top cover portion 442. The first hook fitting portion 2221 is arranged at the connecting side wall 441. The top cover portion 442 abuts against an end of the data interface. In some embodiments, the connecting side wall 441 is integrally formed with the top cover portion 442, enhancing the overall rigidity of the locking mounting block 44 and enabling it to withstand external pressure or impact. Moreover, the top cover portion 442 abuts against the end of the data interface to form an end surface support, which can effectively prevent the data interface from displacing or loosening during use.

In the present embodiment, the top cover portion 442 is provided with a first threaded hole 4221. A mounting plate portion 16 extends out from the lock case main body 1. The mounting plate portion 16 is provided with a second threaded hole 161. The screw 5 connects the lock case main body 1 with the locking mounting block 44 via the second threaded hole 161 and the first threaded hole 4221. The screw connection achieves a stable and reliable connection between the lock case main body 1 and the locking mounting block 44, resists an external impact or vibration effectively, and facilitates installation or detachment.

In the present embodiment, the screw 5 is provided with a nut 51, and the nut 51 is a special-shaped nut (i.e., a non-standard nut) 51. A side wall of the nut 51 is provided with a plurality of notches 511. The notch 511 can not only be configured for finger screwing, but also can be engaged with a simple tool such as a screwdriver, a coin, a specialized hook-head wrench, etc. to rotate the nut 51 to fasten connection or disassemble the device.

Fourth Embodiment

This embodiment differs from the first embodiment and the second embodiment as follows. Referring to FIGS. 16-19, quite usefully, the lock case main body 1 includes an upper case 14 and a lower case 15. The upper case 14 is detachably connected to the lower case 15, and a locking cavity 17 is formed between the upper case 14 and the lower case 15. The locking cavity 17 is configured for accommodating a data interface and limiting the data interface in the locking cavity 17. The upper case 14 and the lower case 15 are detachably connected via the locking device 4. The locking device 4 of the present embodiment has the structure identical to that of the locking device 4 in the first embodiment, and details are not described herein again. Through the described structure above, installing the data interface in the locking cavity 17 can effectively avoid damage to the data interface caused by external environment such as dust, water vapor, and impact. Moreover, the upper case 14 and the lower case 15 are connected through the locking device 4, providing the lock case main body 1 with a stable and reliable connecting structure.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A lock for a data interface, comprising:

a lock case main body, the lock case main body being configured for sleeving a data interface, and the lock case main body covering the data interface;

a locking device, wherein the locking device is configured for locking the lock case main body to the data interface;

wherein the lock case main body is provided with a first opening, and the first opening is configured for sleeving the data interface;

wherein the locking device comprises a locking mounting block, the first opening of the lock case main body is sleeved on the locking mounting block and the data interface, the locking mounting block is arranged between an inner wall of the lock case main body and the data interface, such that an inner wall of the first opening stops the locking mounting block at a side wall of the data interface;

wherein the locking mounting block is provided with a first hook fitting portion, the first hook fitting portion is connected to a first hook portion of the side wall of the data interface, and the inner wall of the first opening stops the first hook fitting portion of the locking mounting block from the first hook portion of the data interface.

2. The lock for the data interface according to claim 1, wherein the lock case main body comprises an upper case and a lower case, the upper case is detachably connected to the lower case, and the upper case covers the data interface.

3. The lock for the data interface according to claim 2, further comprising the locking device, wherein the upper case and the lower case are detachably connected via the locking device.

4. The lock for the data interface according to claim 3, wherein the upper case of the lock case main body is further provided with a second opening, the locking device comprises a mounting housing, a lock cylinder and a baffle plate, the mounting housing is mounted on the second opening, the lock cylinder is arranged in the mounting housing, and the lock cylinder is rotatable in the mounting housing, the baffle plate is sleeved on the lock cylinder, and the baffle plate is rotatable with the lock cylinder, so that the baffle plate is rotatable between a first position and a second position, and when the baffle plate moves to the first position, the baffle plate is configured for locking the upper case to the lower case tightly, and when the baffle moves to the second position, the baffle plate is configured for releasing the lock between the upper case and the lower case.

5. The lock for the data interface according to claim 4, wherein a stop portion extends out from the lower case, and when the baffle plate moves to the first position, the stop portion stops the baffle plate in the lower case, so as to lock the upper case to the lower case.

6. The lock for the data interface according to claim 1, wherein the lock case main body comprises the upper case and the lower case, the upper case is detachably connected to the lower case, and a locking cavity is formed between the upper case and the lower case, the locking cavity is configured for accommodating the data interface and limiting the data interface in the locking cavity; the lock for the data interface further comprises a locking device, and the upper case and the lower case are detachably connected via the locking device.

7. A lock for a data interface, comprising:

a lock case main body, the lock case main body being configured for sleeving a data interface, and the lock case main body covering the data interface;

a locking device, wherein the locking device is configured for locking the lock case main body to the data interface;

wherein the lock case main body is provided with a first opening, and the first opening is configured for sleeving the data interface;

wherein the locking device comprises a locking mounting block, the first opening of the lock case main body is sleeved on the locking mounting block and the data interface, the locking mounting block is arranged between an inner wall of the lock case main body and the data interface, such that an inner wall of the first opening stops the locking mounting block at a side wall of the data interface; the lock case main body is connected to the locking mounting block, and the connection is configured for connecting the lock case main body and the locking mounting block to the data interface to form a whole; the lock case main body is detachably connected to the locking mounting block;

wherein the lock case main body is detachably connected to the locking mounting block via a screw; and the screw is arranged in the lock case main body to prevent the screw from being exposed.

8. The lock for the data interface according to claim 7, wherein the lock case main body and the locking mounting block are detachably connected via a screw or a buckle or a rivet or a mortise-and-tenon joint or a bolt.

9. The lock for the data interface according to claim 7, wherein the locking mounting block is provided with a connecting side wall and a top cover portion, the connecting side wall is connected to the top cover portion, the first hook fitting portion is provided on the connecting side wall, and the top cover portion abuts against an end portion of the data interface.

10. The lock for the data interface according to claim 9, wherein the lock case main body and the locking mounting block are detachably connected via screws; the top cover portion is provided with a first threaded hole, the lock case main body extends out of a mounting plate portion, the mounting plate portion is provided with a second threaded hole, and the screw connects the lock case main body to the locking mounting block through the second threaded hole and the first threaded hole.

11. A lock for a data interface, comprising:

a lock case main body, the lock case main body being configured for sleeving a data interface, and the lock case main body covering the data interface;

a locking device, wherein the locking device is configured for locking the lock case main body to the data interface;

wherein the lock case main body is provided with a first opening, and the first opening is configured for sleeving the data interface;

wherein the locking device comprises a locking mounting block, the first opening of the lock case main body is sleeved on the locking mounting block and the data interface, the locking mounting block is arranged between an inner wall of the lock case main body and the data interface, such that an inner wall of the first opening stops the locking mounting block at a side wall of the data interface; the lock case main body is connected to the locking mounting block, and the connection is configured for connecting the lock case main body and the locking mounting block to the data interface to form a whole; the lock case main body is detachably connected to the locking mounting block;

wherein the lock case main body is detachably connected to the locking mounting block via the screw; the screw is provided with a nut, and the nut is a special-shaped nut.

12. A lock for a data interface, comprising:

a lock case main body, the lock case main body being configured for sleeving a data interface, and the lock case main body covering the data interface;

wherein the lock case main body is provided with a first opening, and the first opening is configured for sleeving the data interface;

wherein the lock for a data interface further comprises a locking arm, wherein the locking arm is rotatably connected to the lock case main body; the locking arm is rotatable between a locking position and an unlocking position;

the lock for the data interface further comprises a locking device, the locking device is connected to the lock case main body, and the locking device is configured for locking the locking arm; when the locking device is in an unlocked state, the locking arm is movable between the locking position and the unlocking position, and when the locking device is in a locked state, the locking arm cannot rotate, and the locking device locks the locking arm in the locking position to make the locking arm and a side wall of the first opening clamp the data interface tightly.

13. The lock for the data interface according to claim 12, wherein the lock case main body further comprises a second opening, the locking device comprises a mounting housing, a lock cylinder and a baffle plate, the mounting housing is mounted on the second opening, the lock cylinder is rotatably provided in the mounting housing, the baffle plate is sleeved on the lock cylinder, and the baffle plate is rotatable with the lock cylinder, so that the baffle is movable between the first position and the second position, and when the baffle plate moves to the first position, the baffle plate is configured for locking the locking arm in the locking position; when the baffle plate moves to the second position, the baffle plate is configured for releasing an obstruction on the locking arm, allowing the locking arm to rotate to the unlocked position so as to release the clamping action of the locking arm on the data interface.

14. The lock for the data interface according to claim 13, wherein the locking arm is provided with a first end, a second end, a rotating shaft, and a connecting end arranged between the first end and the second end, and the connecting end is rotatably connected to the lock case main body through the rotating shaft; when the baffle plate moves to the first position, the baffle plate pushes the first end in a direction away from the side wall of the first opening to stop it, so as to push the second end in a direction towards the side wall of the first opening to stop it, the second end of the locking arm is stopped and locked in the locking position, and the second end of the locking arm and the side wall of the first opening clamp the data interface tightly; when the baffle plate moves to the second position, the baffle plate releases the obstruction on the locking arm, so that the first end is rotatable in the direction towards the side wall of the first opening, and the second end is capable of rotating to the unlocking position in the direction away from the side wall of the first opening to disengage the second end from the data interface, releasing the clamping action of the second end of the locking arm on the data interface; the lock case main body is further provided with an avoidance slot; when the baffle plate moves to the first position, the baffle plate is positioned in the avoidance slot; the baffle plate pushes the first end in the direction away from the side wall of the first opening to stop it, so as to push the second end in the direction towards the side wall of the first opening to stop it, and the first end cannot rotate into the avoidance slot; when the baffle plate moves to the second position, the baffle plate moves out of the avoidance slot, and the baffle plate releases the obstruction on the locking arm, enabling the first end to rotate into the avoidance slot in the direction towards the side wall of the first opening, and the second end is capable of rotating to the unlocking position in the direction away from the side wall of the first opening to disengage the second end from the data interface, releasing the clamping action of the second end of the locking arm on the data interface.

15. The lock for the data interface according to claim 14, wherein the second end of the locking arm is provided with a first hook portion, and when the locking arm rotates to the locking position, the first hook portion is connected to a first hook fitting portion of the data interface; the first end of the locking arm is provided with a second positioning groove; when the baffle plate moves to the first position, the baffle plate abuts against an inner wall of the second positioning groove; the baffle plate pushes the first end in the direction away from the side wall of the first opening to stop it, so as to push the second end in the direction towards the side wall of the first opening to stop it; the second end of the locking arm is stopped and locked in the locking position, the second end of the locking arm and the side wall of the first opening clamp the data interface tightly; the data interface is an OBD data interface.

16. The lock for the data interface according to claim 13, wherein a plurality of first locking members are provided in the mounting housing, and the first locking members are configured for locking the lock cylinder to the mounting housing; when the first locking member is in the unlocked state, the lock cylinder is rotatable in the mounting housing, and the baffle plate is rotatable with the lock cylinder, so that the baffle plate is rotatable between the first position and the second position; when the first locking member is in a locked state, the lock cylinder cannot rotate in the mounting housing, so as to fix the baffle plate to the second position, making the baffle plate stop and lock the locking arm in the locking position; the lock cylinder is provided with a key hole, the first locking member comprises a first locking pin, a second locking pin and a first spring, a first locking hole is provided in the mounting housing, a second locking hole is provided in the locking cylinder, the first spring is provided in the first locking hole, a first end of the first locking pin is connected to the first spring, the second locking pin is configured for inserting into the second locking hole, a second end of the first locking pin abuts against the second locking pin, a first joint is formed between the first locking pin and the second locking pin, and a second joint is provided at a position of the connection between the lock cylinder and the mounting housing, when the first joint aligns with the second joint, the first locking member is in the unlocked state, two ends of the first locking pin are both positioned in the first locking hole, two ends of the second locking pin are both positioned in the second locking hole, the lock cylinder is rotatable in the mounting housing, and the baffle plate is rotatable with the lock cylinder, so that the baffle plate is rotatable between the first position and the second position; when the first joint and the second joint are misaligned, the first locking member is in the locked state, the first end of the first locking pin is inserted into the second locking hole, and the second end of the first locking pin is inserted into the first locking hole, so that the lock cylinder cannot rotate in the mounting housing; or, when the first joint and the second joint are misaligned, the first locking member is in a locked state, a first end of the second locking pin is inserted into the second locking hole, and a second end of the second locking pin is inserted into the first locking hole, so that the lock cylinder cannot rotate in the mounting housing; the plurality of the first locking pins of the first locking member are identical in lengths, and the plurality of the second locking pins of the first locking member are different in lengths.

* * * * *